(12) United States Patent
Lehnert

(10) Patent No.: US 11,910,147 B2
(45) Date of Patent: *Feb. 20, 2024

(54) WIRELESS EARBUD CHARGING

(71) Applicant: Sonos, Inc., Santa Barbara, CA (US)

(72) Inventor: Hilmar Lehnert, Framington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,936

(22) Filed: Dec. 1, 2022

(65) Prior Publication Data

US 2023/0224622 A1    Jul. 13, 2023

Related U.S. Application Data

(63) Continuation of application No. 16/915,676, filed on Jun. 29, 2020, now Pat. No. 11,523,206.

(60) Provisional application No. 62/867,938, filed on Jun. 28, 2019.

(51) Int. Cl.
| | |
|---|---|
| *H04R 1/02* | (2006.01) |
| *H04R 1/10* | (2006.01) |
| *H04R 5/04* | (2006.01) |
| *H02J 50/12* | (2016.01) |
| *H04R 5/033* | (2006.01) |

(52) U.S. Cl.
CPC ............ *H04R 1/1025* (2013.01); *H02J 50/12* (2016.02); *H04R 5/033* (2013.01); *H04R 5/04* (2013.01); *H04R 2420/07* (2013.01)

(58) Field of Classification Search
CPC ........ H04R 1/1025; H04R 5/033; H04R 5/04; H04R 2420/07; H02J 50/12
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Jason R Kurr
(74) *Attorney, Agent, or Firm* — Fortem IP LLP; Benjamin Urban

(57) ABSTRACT

Examples described herein relate to a charging system for wireless earbuds involving charging adapters that are attachable to the wireless earbuds. In some implementations, the charging adapter is attachable to an external surface of an earbud using a magnetic or mechanical interface that align electrodes of the charging adapter with electrodes on the wireless headset, allowing an internal battery of the earbud to draw current and charge from the charging adapter while the earbud is in-ear. Then, when the internal battery is and recharged using a charging case or wall charger, the charging adapter can be detached from the earbud.

20 Claims, 23 Drawing Sheets

(56) References Cited

U.S. PATENT DOCUMENTS

| | | |
|---|---|---|
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 11,523,206 B2 * | 12/2022 | Lehnert ............... H04R 1/1025 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2017/0094399 A1 * | 3/2017 | Chandramohan .... H04R 1/1058 |
| 2018/0064224 A1 | 3/2018 | Brzezinski et al. |
| 2019/0124431 A1 | 4/2019 | Jeong et al. |
| 2020/0266640 A1 | 8/2020 | Valenzuela |
| 2020/0321791 A1 * | 10/2020 | Rugolo ............... H04R 1/1025 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jun. 29, 2022, issued in connection with U.S. Appl. No. 16/915,676, filed Jun. 29, 2020, 10 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Mar. 9, 2022, issued in connection with U.S. Appl. No. 16/915,676, filed Jun. 29, 2020, 17 pages.
Notice of Allowance dated Sep. 14, 2022, issued in connection with U.S. Appl. No. 16/915,676, filed Jun. 29, 2020, 9 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

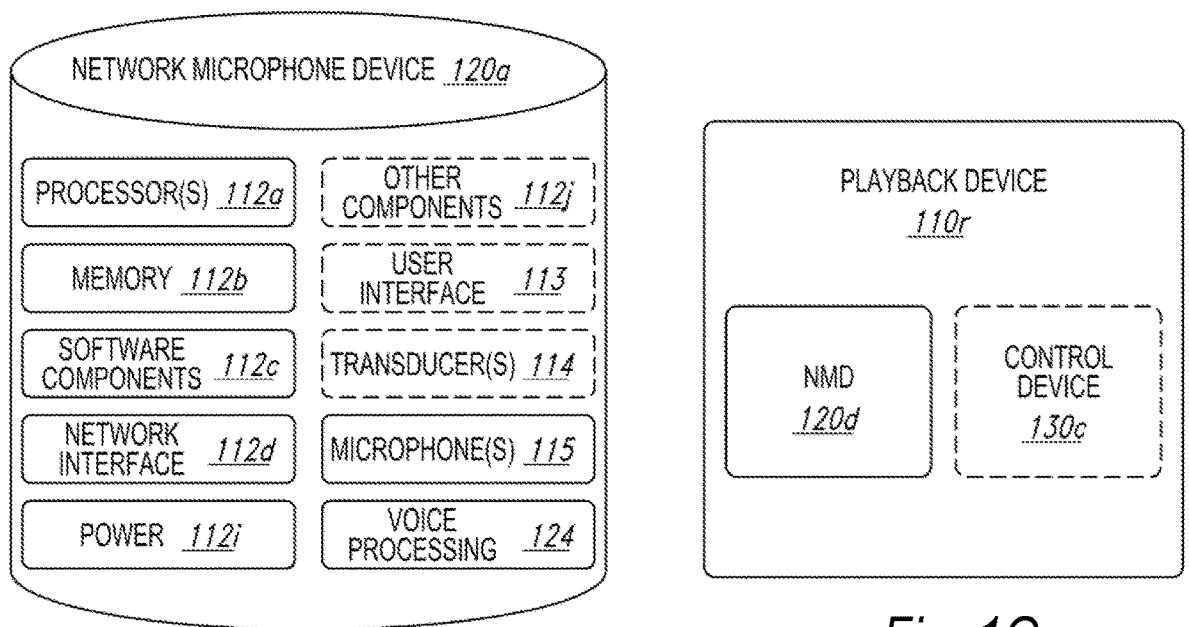
Fig. 1F
Fig. 1G
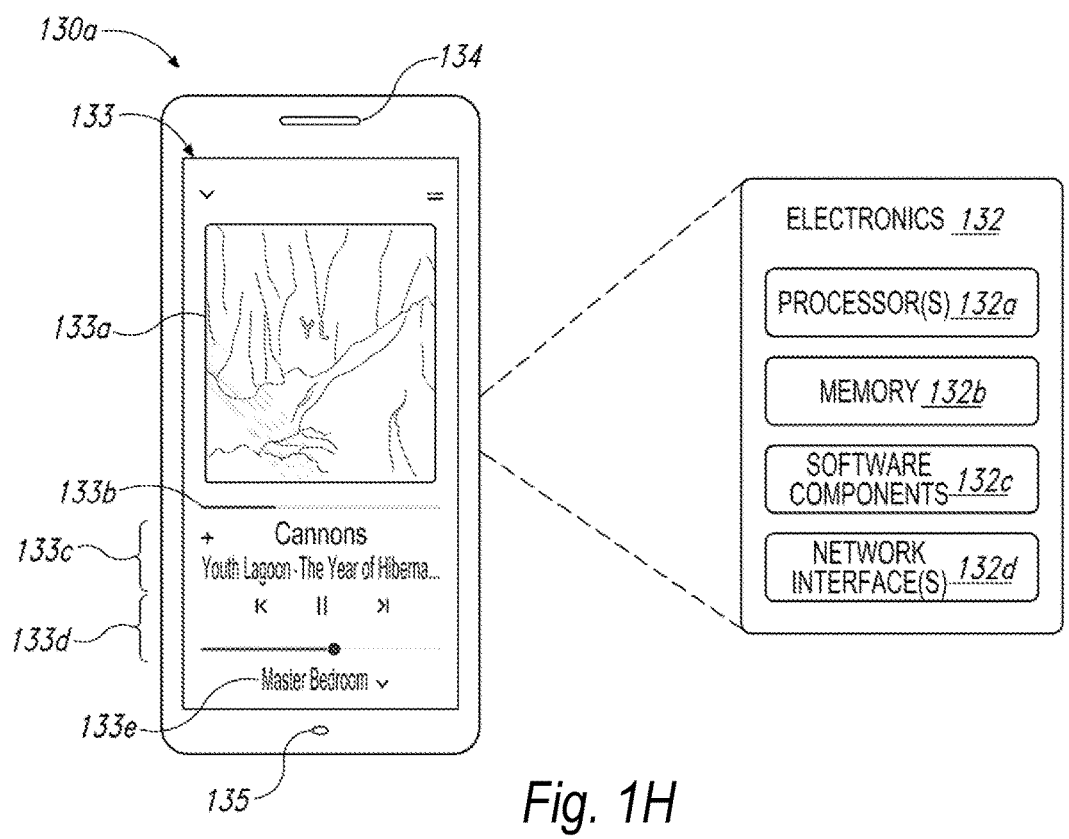
Fig. 1H

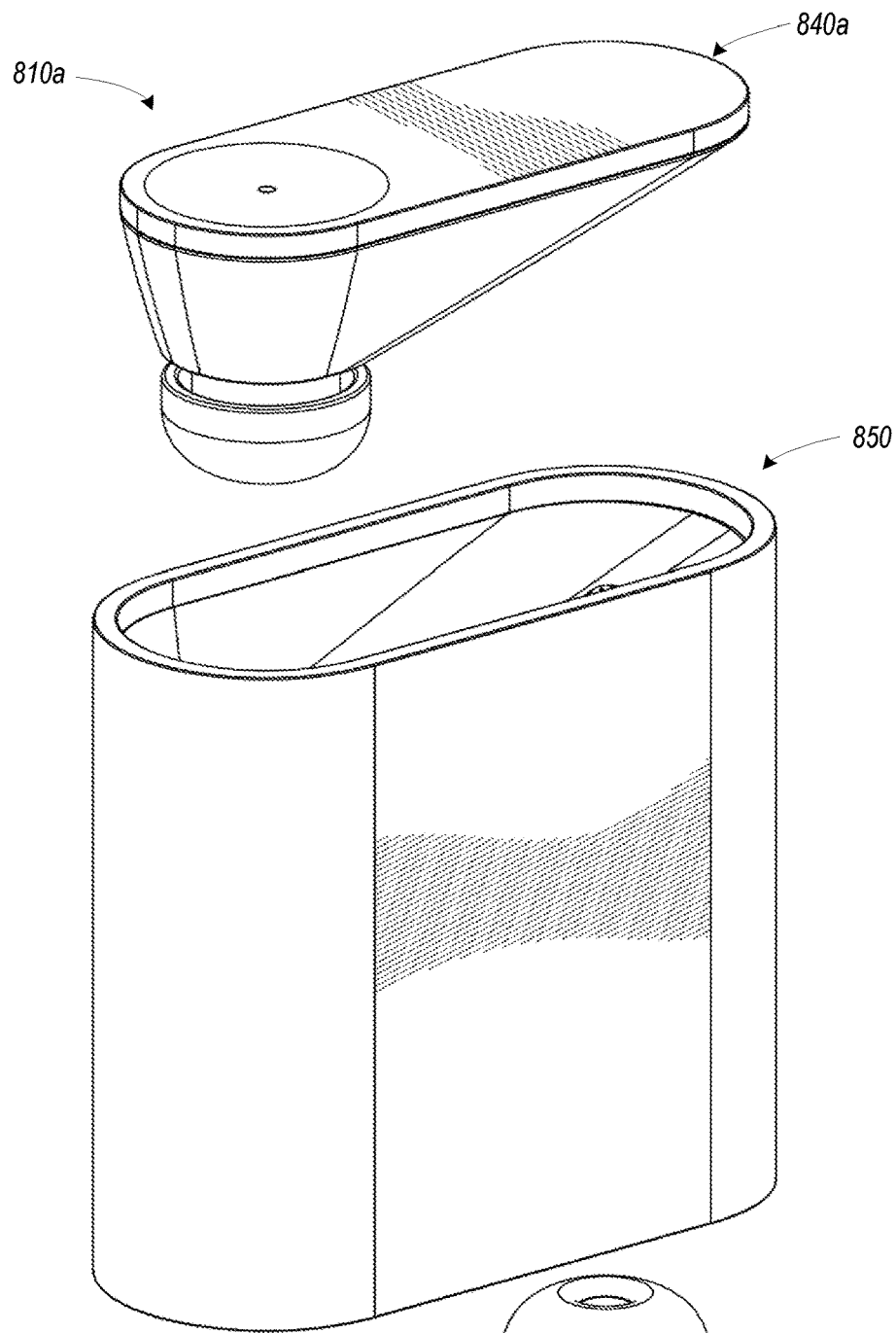
Fig. 8F
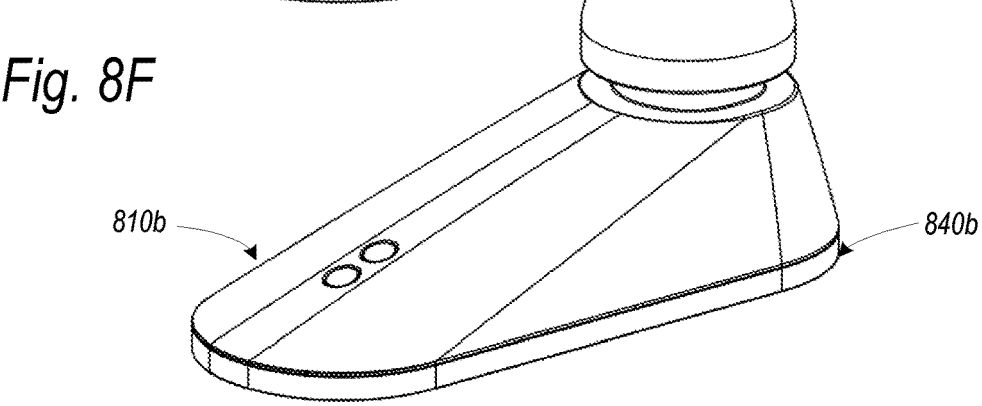

WIRELESS EARBUD CHARGING

CROSS-REFERENCE TO RELATED APPLICATIONS

This application claims priority under 35 U.S.C. § 120 to, and is a continuation of U.S. patent application Ser. No. 16/915,676, filed on Jun. 29, 2020, entitled "Wireless Earbud Charging," which is incorporated herein by reference in its entirety.

U.S. patent application Ser. No. 16/915,676 claims the benefit under 35 U.S.C. § 119 of U.S. provisional Patent Application No. 62/867,938, filed on Jun. 28, 2019, entitled "Wireless Earbud Charging," which is incorporated herein by reference in its entirety

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIG. 8F is a front isometric view of earbuds illustrating exemplary arrangement with the charging case.

Figure 1A:
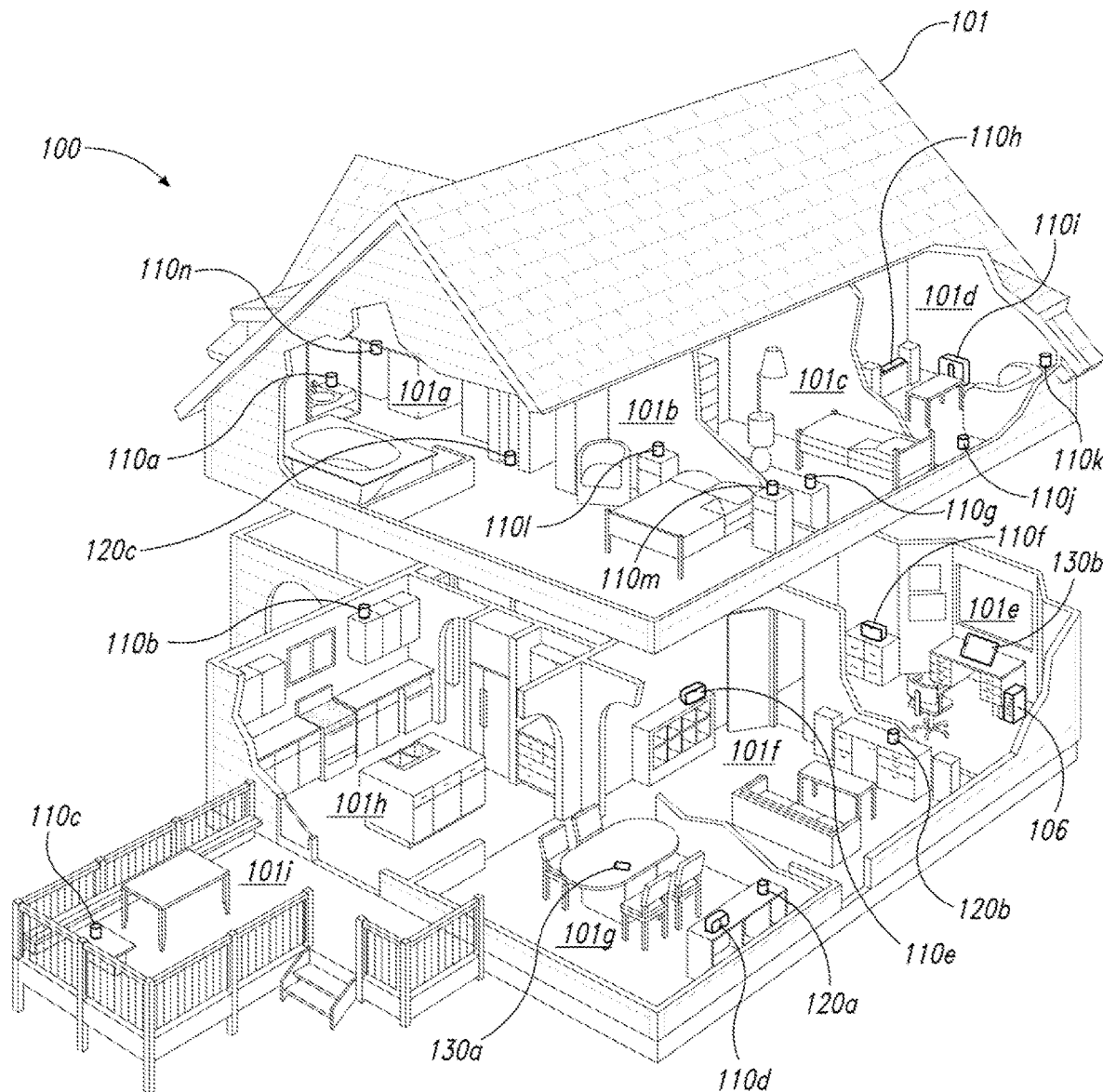
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Examples described herein relate to a charging system for wireless earbuds involving charging adapters that are attachable to the wireless earbuds. Wireless earbuds generally have limited play time due to size and weight requirements for comfortable use in-ear. Some wireless earbuds include one or more case batteries in a charging case, so that when the internal batteries of the wireless earbuds are depleted, they can be put into the charging case and recharged using the case batteries. While such a charging case allows wireless earbuds to be recharged away from wall power, one problem with this implementation is that the wireless earbuds cannot be used while they are being recharged in the charging case.

Other workarounds for limited play time of wireless earbuds exist as well. For instance, some users will charge one earbud while listening with the other one; the disadvantages of this approach include loss of stereo sound, as well as the additional attention required for switching between the earbuds. Some wireless earbuds support quick charging, such that 15 minutes of charging provides 1-2 hours of playtime; this approach, like the charging case, is disruptive to playback. Yet further, other wireless earbuds include a detectable neckband with an extra battery. This implementation is cumbersome and affects usability.

As noted above, example implementations described herein involve a charging adapter that includes one or more batteries (referred to herein as "adapter batteries"). In some implementations, the charging adapter is attachable to an external surface of an earbud using a magnetic or mechanical interface that align electrodes of the charging adapter with electrodes on the wireless headset, allowing an internal battery of the earbud to draw current and charge from the charging adapter while the earbud is in-ear. Then, when the internal battery is and recharged using a charging case or wall charger, the charging adapter can be detached from the earbud.

Given such charging adapters, example systems may include a charging case configured to charge the charging adapters independently of or concurrently with the earbuds. For instance, a charging case may include first and second volumes shaped to carry a first earbud and a second earbud while attached to a first charging adapter and a second charging adapter, respectively. Further, the charging case may be configured to carry the earbuds and charging adapters in such a manner that electrodes in the charging case, the charging adapters, and the earbuds align so that the charging case charges the charging adapters, which in turn charge the earbuds. Alternatively, the charging case may include separate volumes configured to carry a left earbud, a right earbud, and a first and second charging adapter.

In such implementations, the earbuds can be considered as operating in one of three different modes. In a first ("normal") mode, the earbuds are in-ear for playback, while the charging adapters are in the charging case being charged. In a second ("active charging") mode, the charging adapters are attached to the earbuds and charging the earbuds while the earbuds are in operation. In a third ("passive charging") mode, the charging adapters are attached to the earbuds and carried in the charging case. While in the passive charging mode, the charging case charges both the charging adapters and the earbuds, either independently or via attachment. If the charging case is disconnected from wall power, case batteries in the charging case charge the carried charging adapters and/or earbuds, until depleted. If the charging case is connected to wall power, the charging case charges its case batteries in addition to the charging adapters and the earbuds.

As noted above, example techniques described herein involve a system for wireless earbud charging. An example system includes a pair of earbuds including a first earbud and a second earbud, a first and second charging adapter comprising one or more respective charging batteries, and a charging case.

The first earbud includes a first IEEE 802.15-compatible interface, a first internal battery, a first audio driver, a housing carrying the first IEEE 802.15-compatible interface and the first internal battery. The housing of the first earbud comprises a first portion insertable into a first ear canal, the first portion carrying the first audio driver and a second portion carrying a magnetic interface that includes one or more magnets that (i) attach the first charging adapter externally to the housing of the first earbud and (ii) align electrodes of the first charging adapter to electrodes of the magnetic interface. The first earbud further includes a first controller carried in the housing of the first earbud and configured to perform functions comprising detecting attachment of the first charging adapter to the magnetic interface and based on detecting that the first charging adapter is attached to the magnetic interface, causing the first internal battery to charge from the first charging adapter. Charging the first internal battery comprises drawing current from the one or more adapter batteries of the first charging adapter via the electrodes of the magnetic connection interface and the electrodes of the first charging adapter. The second earbud is similar to the first earbud.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 includes one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 includes a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones.

Example synchrony techniques involve a group coordinator providing audio content and timing information to one or more group members to facilitate synchronous playback among the group coordinator and the group members. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
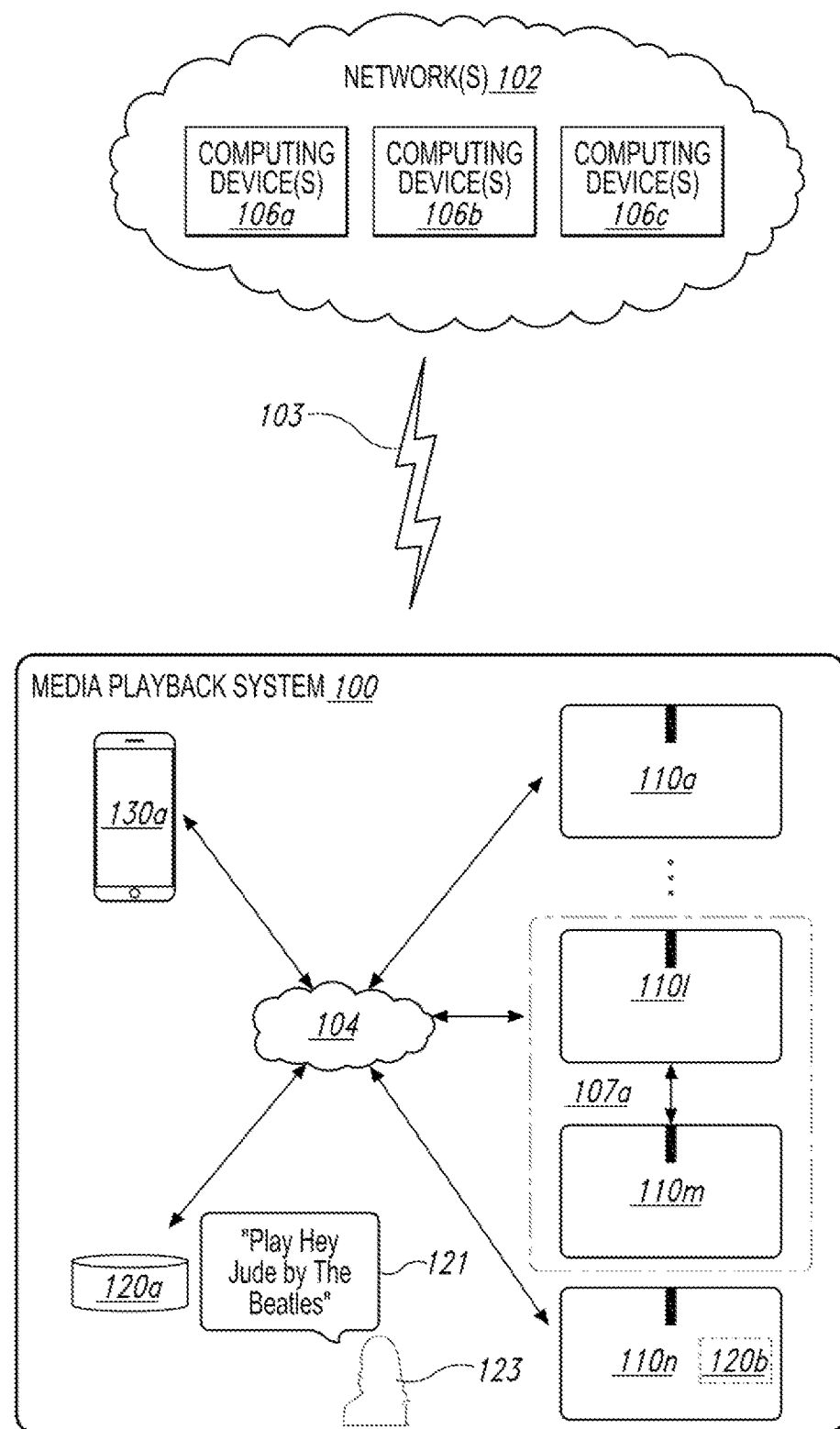
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/ or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 includes computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 includes a plurality of cloud networks comprising communicatively coupled computing devices. Furthermore, while the cloud network 102 is shown in FIG. 1B as having three of the computing devices 106, in some embodiments, the cloud network 102 includes fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 includes a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 includes an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a includes a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c includes one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
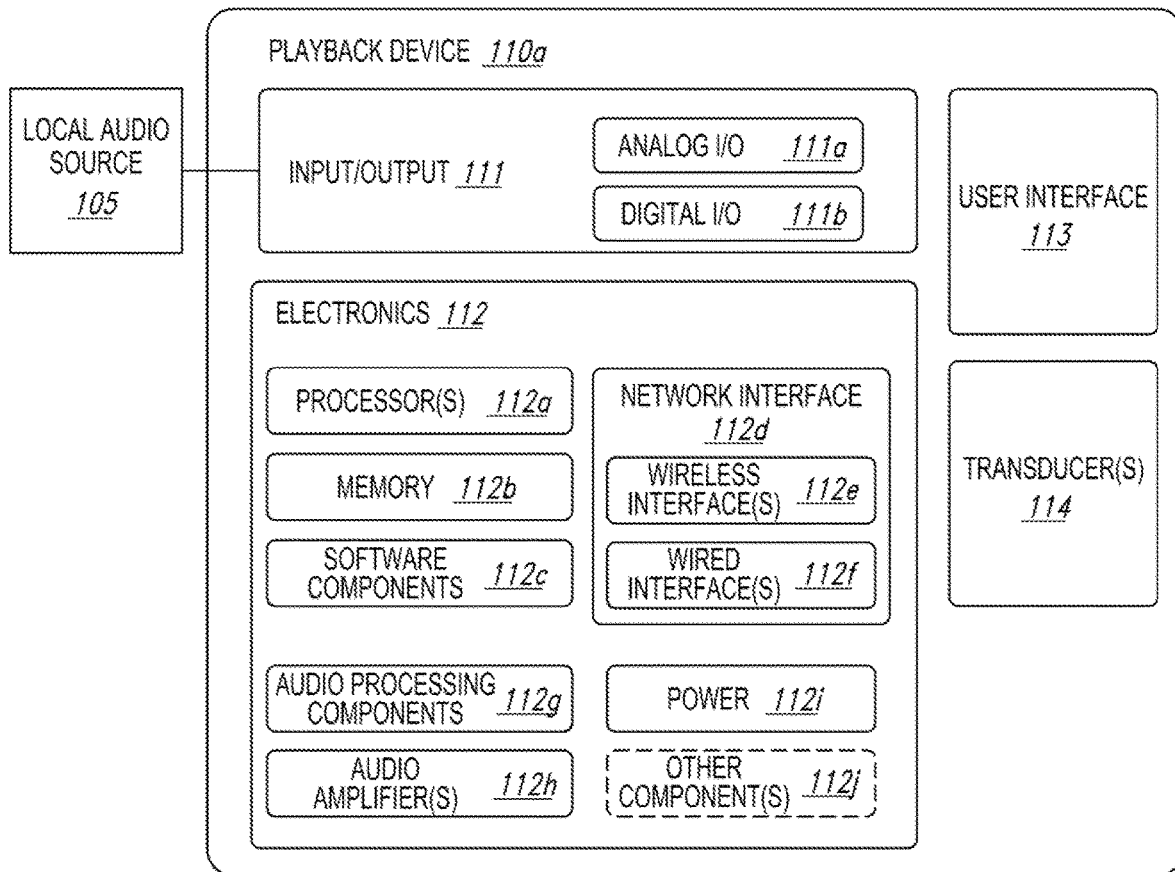
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b includes a Sony/Philips Digital Interface Format (S/PDIF) communication interface and/or cable and/or a Toshiba Link (TOSLINK) cable. In some embodiments, the digital I/O 111b includes an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further includes electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d includes one or more wireless interfaces 112e (referred to hereinafter as "the wireless interface 112e"). The wireless interface 112e (e.g., a suitable interface comprising one or more antennas) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
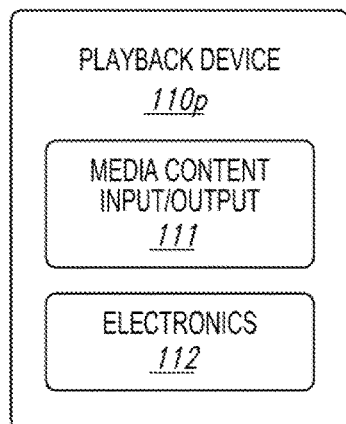
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 includes wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
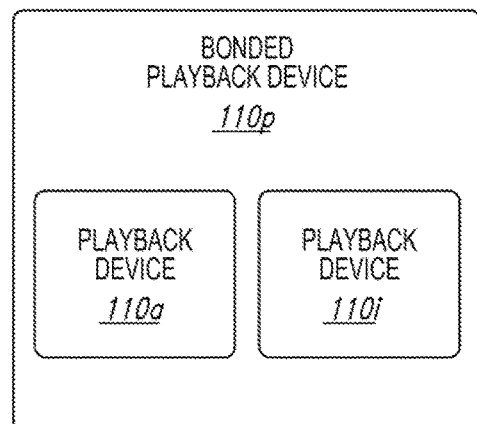
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q includes a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally includes other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a includes an Internet of Things (IoT) device such as, for example, a thermostat, alarm panel, fire and/or smoke detector, etc. In some embodiments, the NMD 120a includes the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a includes a smartphone (e.g., an iPhone™, an Android phone) on which media playback system controller application software is installed. In some embodiments, the control device 130a includes, for example, a tablet (e.g., an iPad™), a computer (e.g., a laptop computer, a desktop computer), and/or another suitable device (e.g., a television, an automobile audio head unit, an IoT device). In certain embodiments, the control device 130a includes a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 includes a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

III. Example Wireless Earbud Charging System

Figure 2A:
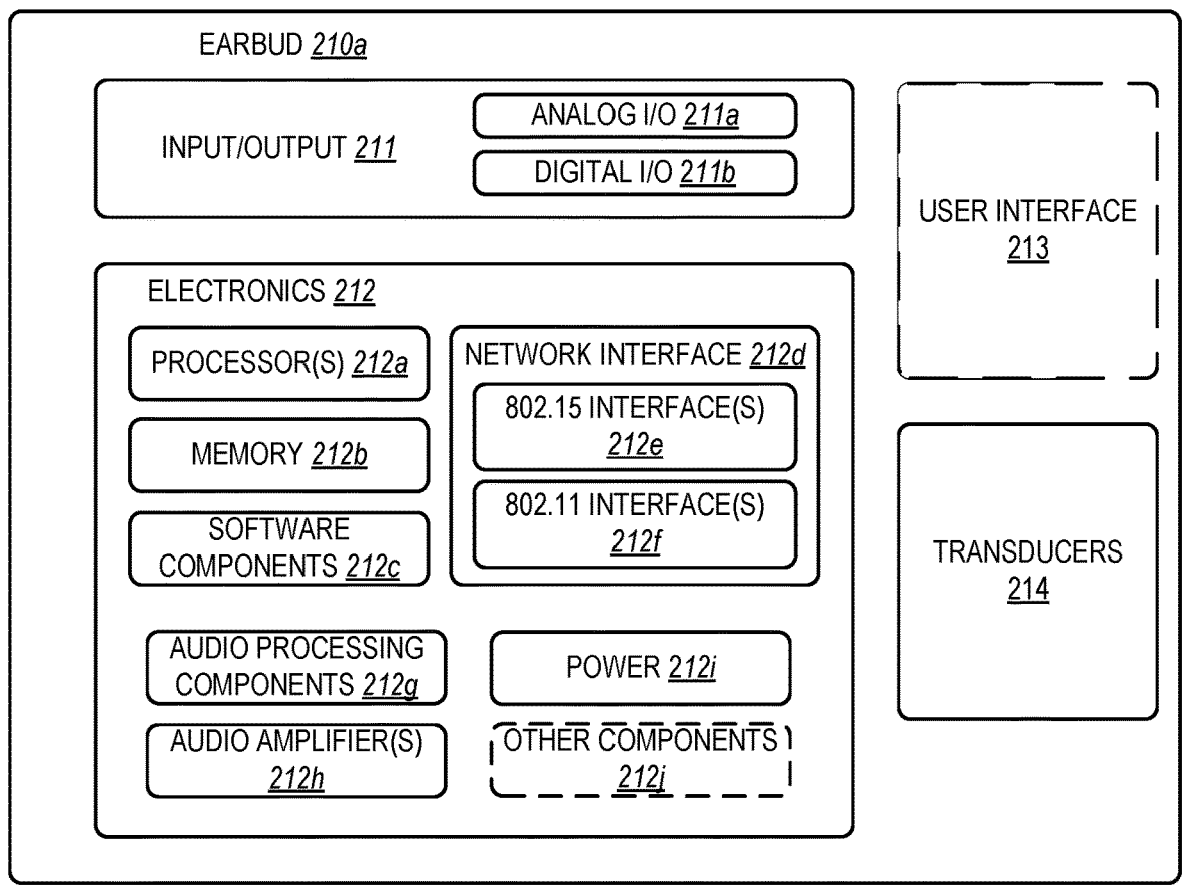
FIG. 2A is a block diagram of an earbud configured in accordance with aspects of the disclosed technology.

As noted above, example implementations may involve a pair of earbuds. To illustrate, FIG. 2A is a block diagram of an example earbud 210a. The earbud 210a may be used in a pair with another earbud 210 (e.g., an earbud 210b). As shown in the block diagram of FIG. 2A, the earbud 210a includes several of the same or similar components as the playback device 110a. However, to facilitate portable use, the earbud 210a is implemented in an earbud form factor and includes an internal battery in power 212i to provide portable power.

The earbud 210a includes an input/output 211, which can include an analog I/O 211a and/or a digital I/O 211b similar to the components of the playback device 110. The earbud 210a further include electronics 212, a user interface 213 (e.g., one or more buttons, knobs, dials, touch-sensitive surfaces, displays, touchscreens), and one or more transducers 214 (referred to hereinafter as "the transducers 214"). The electronics 212 is configured to receive audio from an audio source via the input/output 211 and/or one or more of the computing devices 106a-c via the network 104 (FIG. 1B)), amplify the received audio, and output the amplified audio for playback via one or more of the transducers 214.

In some embodiments, the earbud 210a optionally includes one or more microphones 215 (e.g., a single microphone, a plurality of microphones, a microphone array) (hereinafter referred to as "the microphones 215"). In certain embodiments, for example, the earbud 210a having one or more of the optional microphones 215 can operate as an NMD configured to receive voice input from a user and correspondingly perform one or more operations based on the received voice input.

In the illustrated embodiment of FIG. 2A, the electronics 212 include one or more processors 212a (referred to hereinafter as "the processors 212a"), memory 212b, software components 212c, a network interface 212d, one or more audio processing components 212g (referred to hereinafter as "the audio components 212g"), one or more audio amplifiers 212h (referred to hereinafter as "the amplifiers 212h"), and power 212i (e.g., one or more power supplies, power cables, power receptacles, batteries, induction coils, Power-over Ethernet (POE) interfaces, and/or other suitable sources of electric power). In some embodiments, the electronics 212 optionally include one or more other components 212j (e.g., one or more sensors, video displays, touchscreens).

The network interface 212d is configured to facilitate a transmission of data between the earbud 210a and one or more other devices on a data network such as, for example, the links 103 and/or the network 104 (FIG. 1B). The network interface 212d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 212d can parse the digital packet data such that the electronics 212 properly receives and processes the data destined for the earbud 210a.

In the illustrated embodiment of FIG. 2A, the network interface 212d includes an 802.15 interface 212e (referred to hereinafter as "the 802.15 interface 212e") and a 802.11 interface 212f. The network interface 212d (e.g., suitable interfaces comprising one or more antennae) can be configured to wirelessly communicate with one or more other devices (e.g., one or more of the playback devices 110, NMDs 120, control devices 130 that are communicatively coupled to the network 104 (FIG. 1B) in accordance with a suitable wireless communication protocol (e.g., WiFi, LTE). Further, the network interface 212d can be configured to wirelessly communicate with an earbud 210b to form a pair of earbuds 210.

In some embodiments, the network interface 212d optionally includes a wired interface (e.g., an interface or receptacle configured to receive a network cable such as an Ethernet, a USB-A, USB-C, and/or Thunderbolt cable) configured to communicate over a wired connection with other devices in accordance with a suitable wired communication protocol. In some embodiments, the electronics 212 excludes the network interface 212d altogether and transmits and receives media content and/or other data via another communication path (e.g., the input/output 711).

The audio components 212g are configured to process and/or filter data comprising media content received by the electronics 212 (e.g., via the input/output 211 and/or the network interface 212d) to produce output audio signals. In some embodiments, the audio processing components 212g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 212g can comprise one or more subcomponents of the processors 212a. In some embodiments, the electronics 212 omits the audio processing components 212g. In some aspects, for example, the processors 212a execute instructions stored on the memory 212b to perform audio processing operations to produce the output audio signals.

The amplifiers 212h are configured to receive and amplify the audio output signals produced by the audio processing components 212g and/or the processors 212a. The amplifiers 212h can comprise electronic devices and/or components configured to amplify audio signals to levels sufficient for driving one or more of the transducers 214. In some embodiments, for example, the amplifiers 212h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 212h comprise a suitable combination of two or more of the foregoing types of power amplifiers. Moreover, in some embodiments, individual ones of the amplifiers 212h correspond to individual ones of the transducers 214. In other embodiments, however, the electronics 212 includes a single one of the amplifiers 212h configured to output amplified audio signals to a plurality of the transducers 214.

The transducers 214 (e.g., one or more speakers and/or speaker drivers) receive the amplified audio signals from the amplifier 212h and render or output the amplified audio signals as sound (e.g., audible sound waves having a frequency between about 20 Hertz (Hz) and 20 kilohertz (kHz)). In some embodiments, the transducers 214 can comprise a single transducer. In other embodiments, however, the transducers 214 comprise a plurality of audio transducers. In some embodiments, the transducers 214 comprise more than one type of transducer. For example, the transducers 214 can include one or more low frequency transducers (e.g., subwoofers, woofers), mid-range frequency transducers (e.g., mid-range transducers, mid-woofers), and one or more high frequency transducers (e.g., one or more tweeters).

Within example implementations, the earbud 210a may operate in one of a first mode and a second mode. In the first mode, the earbud 210a operates independently of the media playback system 100. While in the second mode, the earbud 210a operates as part of the media playback system 100. Generally, the earbud 210a operates in the first mode while in the physical proximity of the media playback system 100 (e.g., while in the home) to facilitate interoperability with the playback device 110a-n of the media playback system 100 and operates in the second mode while "on the go," but the earbud 210a may also be operable in the second mode while in the physical proximity of the media playback system 100. The portable playback device 710 may switch between modes manually (e.g., via user input to a user interface 213) or automatically (e.g., based on proximity to one or more playback devices 110a-n).

In the first mode, the earbud 210a may interface with other devices of the media playback system 100. For instance, the earbud 210a may form synchrony groupings or other arrangements with the playback devices 110a-n in the first mode. Further, in the first mode, the earbud 210a may be controlled by the control device(s) 130 in the same or similar manner as the playback device(s) 110.

In the second mode, rather than operating as one playback device of the media playback system 100, the earbud 210a operates independently. As noted above, this mode can be utilized "on the go" to facilitate playback away from the media playback system 100. Further, this mode can be used in proximity to the media playback system 100, which may facilitate more private use of the earbud 210a.

Figure 2B:
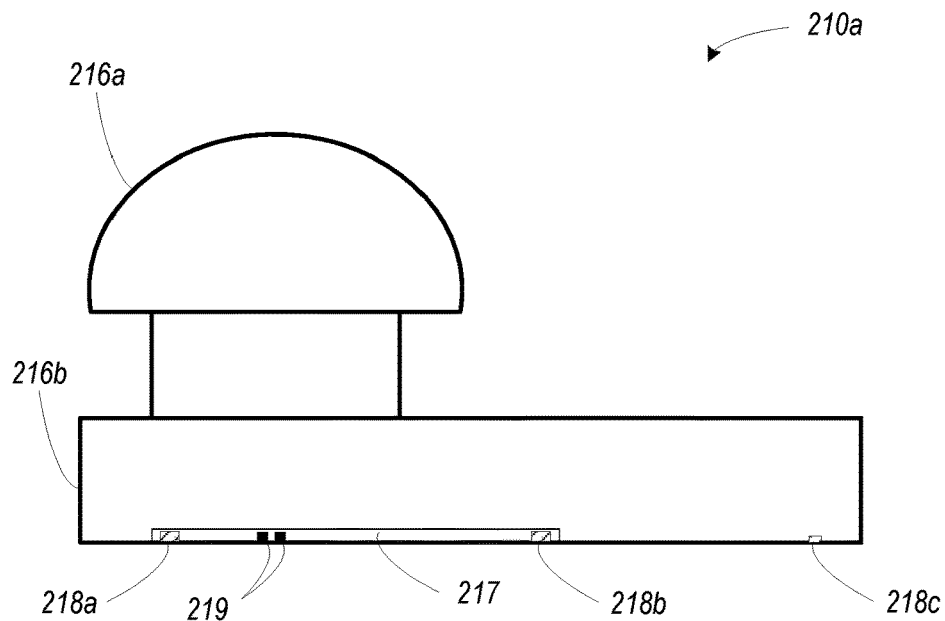
FIG. 2B is a side partial cutaway view of the earbud configured in accordance with aspects of the disclosed technology.

FIG. 2B is a partial cutaway side view of the earbud 210a configured in accordance with aspects of the disclosed technology. As shown in FIG. 2B, the earbud 210a includes a housing 216. Various components of the earbud 210a may be carried in the housing 216, such as the input/output 211, the electronics 212, the user interface 213, and/or the transducers 214.

A first portion of the housing 216 (labeled 216a) is insertable into an ear canal. The first portion 216a carries a first transducer 214a internally. The first transducer 214a is arranged in the first portion 216a to direct sound produced by the first transducer 214a into the ear canal when the first portion 216a is inserted in the ear canal.

Figure 3A:
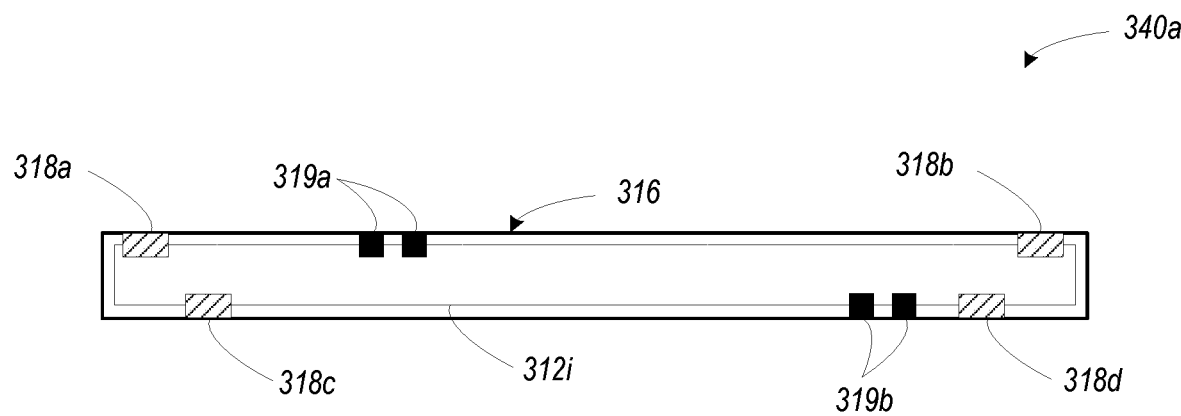
FIG. 3A is a side partial cutaway view of a charging adapter configured in accordance with aspects of the disclosed technology.

A second portion of the housing (labeled 216b) carries a charging-adapter connection interface 217 (referred to herein as a connection interface 217). The connection interface 217 includes magnets 218 (labelled individually as a first magnet 218a and a second magnet 218b). The magnets 218 attach a charging adapter 340a (FIG. 3A) externally to the housing 216 of the earbud 210a (i.e., to the first portion 216a). Further, the magnets 218 align electrodes 219 of the earbud 210a with electrodes of the charging adapter 340a (FIG. 3A). In alternate implementations, the connection interface may utilize mechanical connectors in addition to or as an alternative to the magnets 218.

Figure 4:
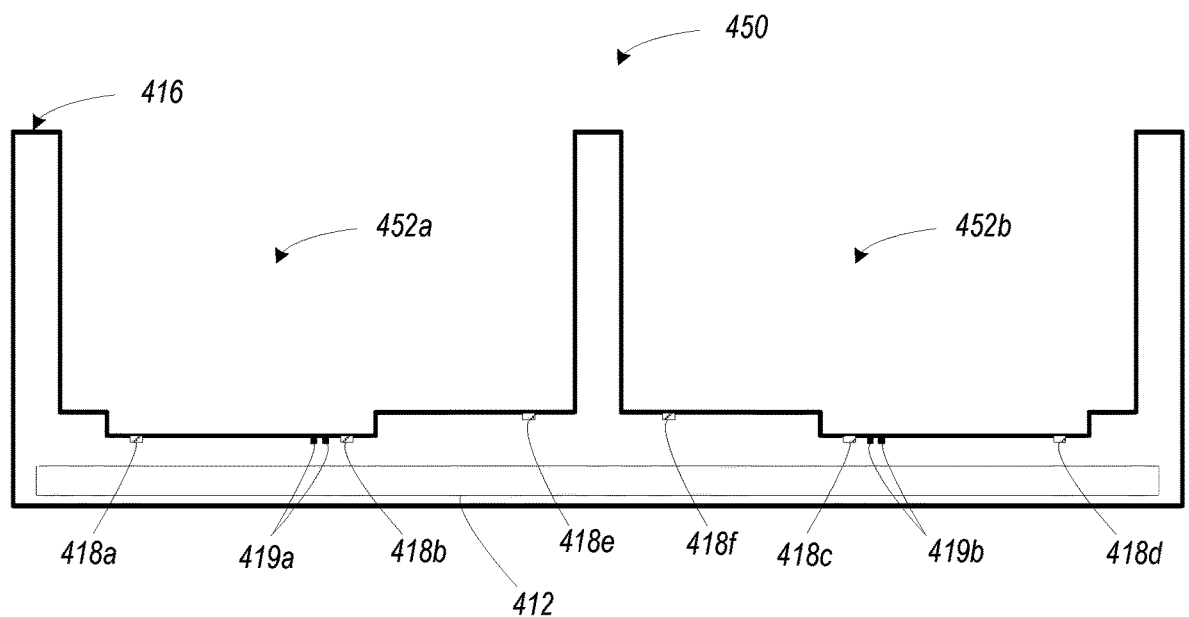
FIG. 4 is a side partial cutaway view of a charging case configured in accordance with aspects of the disclosed technology.

FIG. 3A shows an example charging adapter 340a configured in accordance with aspects of the disclosed technology. The charging adapter 340a includes a housing 316, which carries a power 312i that includes one or more adapter batteries. As shown, the housing 316 is substantially coin-shaped, which may facilitate attaching the charging adapter 340a to the earbud 210a and/or inserting the charging adapter 340a into a charging case 450 (FIGS. 4 and 6).

The charging adapter 340a further includes magnets 318 (labelled individually as a first magnet 318a, a second magnet 318b, a third magnet 318c, and a fourth magnet 318d). The magnets 318a and 318b facilitate attachment of the charging adapter 340a to the connection interface 217 of the earbud 210a.

Figure 3B:
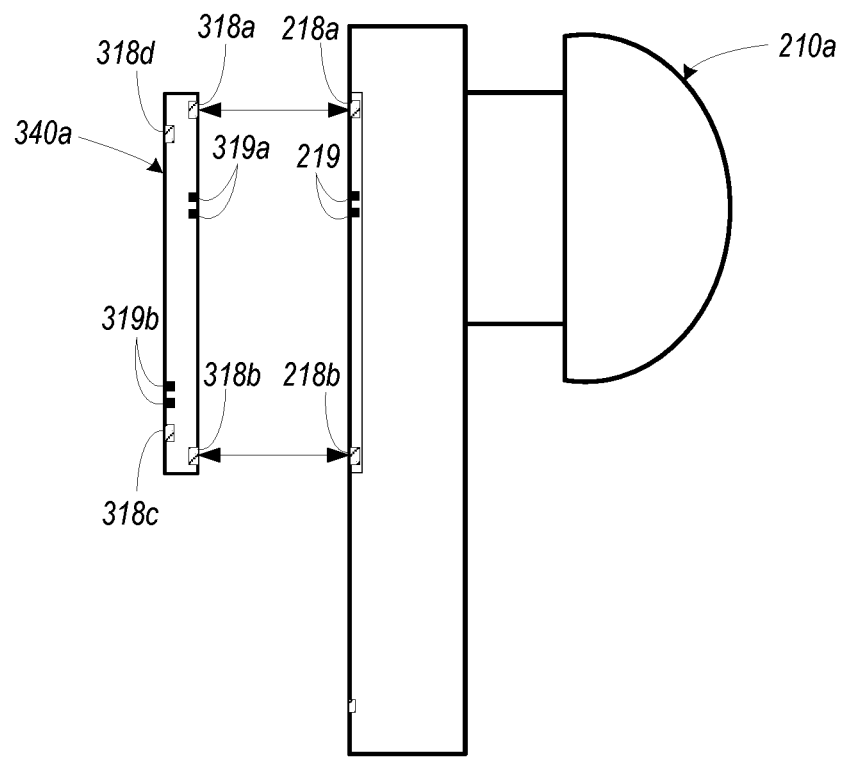
FIG. 3B is a side partial cutaway view of the earbud and the charging adapter configured in accordance with aspects of the disclosed technology.
Figure 3C:
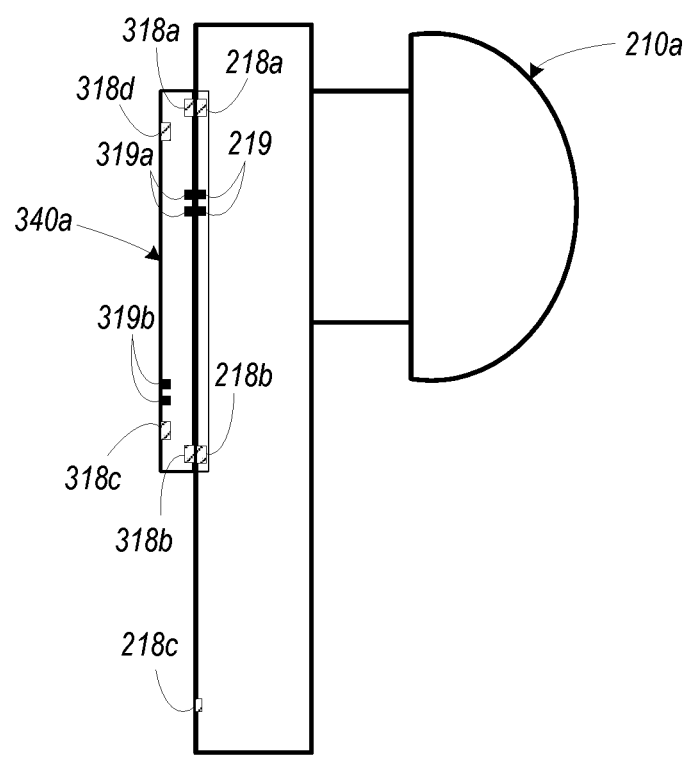
FIG. 3C is another side partial cutaway view of the earbud and the charging adapter configured in accordance with aspects of the disclosed technology.

To illustrate, FIGS. 3B and 3C illustrate exemplary attachment of the charging adapter 340a to the earbud 210a. In particular, as illustrated in FIG. 3B, the magnets 218a and 218b of the earbud 210a are attracted to the magnets 318a and 318b, respectively, of the charging adapter 340a. This magnetic attraction causes the charging adapter 340a to attach to the connection interface 217 of the earbud 210a when in proximity to the connection interface 217.

FIG. 3C shows the charging adapter 340a attached to the earbud 210a. When attached, the electrodes 219 of the earbud 210a are aligned with the electrodes 319a of the charging adapter 340a allowing current to be drawn from the adapter batteries of the charging adapter 340a. The earbud 210a uses this current to charge the battery or batteries of the power 212i.

In an example, a controller of the earbud 210a (which may be implemented via the processors 212a, the memory 212b, and the software components 212b) detects attachment of the first charging adapter to the magnetic interface, such as via completion of a circuit including the electrodes 219. Based on detecting that the first charging adapter is attached to the magnetic interface, the controller causes the battery or batteries of the power 212i to charge from the charging adapter 340a. Charging the battery or batteries of the power 212i may involve drawing current from the one or more adapter batteries of the charging adapter 340a via the electrodes 219 of the connection interface 217 and the electrodes 319a of the charging adapter 340.

FIG. 4 shows an example charging case 450. The charging case 450a includes a housing 416, which carries a power 412i. The housing 416 forms a first volume 452a shaped to carry the charging adapter 340a and the earbud 210a when the charging adapter 340a and the earbud 210a are attached. The housing 416 also forms a second volume 452b shaped to carry a second charging adapter 340b and a second earbud 210b when the charging adapter 340b and the earbud 210b are attached.

The power 412i may include that includes one or more case batteries configured to charge the earbuds 210a and 210b and/or the charging adapters 340a and 340b. Further, the power 412i may include one or more coils. A wireless charger may induce a current in the one or more coils to wirelessly charge the one or more case batteries from wall power connected to the wireless charger. Additionally or alternatively, the power 412 may include a cable port. A cable connected between the cable port and a wall charger may deliver current to charge the one or more case batteries from wall power connected to the wall charger.

In the housing 416, electrodes 419a are arranged to contact the electrodes 319b of the charging adapter 340a when the charging adapter 340a is carried in the first volume 452a formed by the housing 416. To maintain the charging adapter 340a in the first volume 452a, the charging case 450a includes magnets 418a and 418b. Further, to maintain the earbud 210a in the first volume 452a, the charging case 450a optionally includes one or more magnets 418e. The magnets 218 of the earbud 210a and the magnets 318a and 318b of the charging adapter 340a may also or alternatively maintain the earbud 210a in the first volume 452a.

Similarly, in the housing 416, electrodes 419b are arranged to contact the electrodes 319b of a second charging adapter 340b when the charging adapter 340b is carried in the second volume 452b formed by the housing 416. To maintain the charging adapter 340b in the second volume 452b, the charging case 450a includes magnets 418c and 418d. Further, to maintain the earbud 210b in the second volume 452a, the charging case 450a optionally includes one or more magnets 418f. However, similar to the earbud 210a, the magnets 218 of the earbud 210b and the magnets 318a and 318b of the charging adapter 340b may also or alternatively maintain the earbud 210b in the second volume 452b.

Figure 5A:
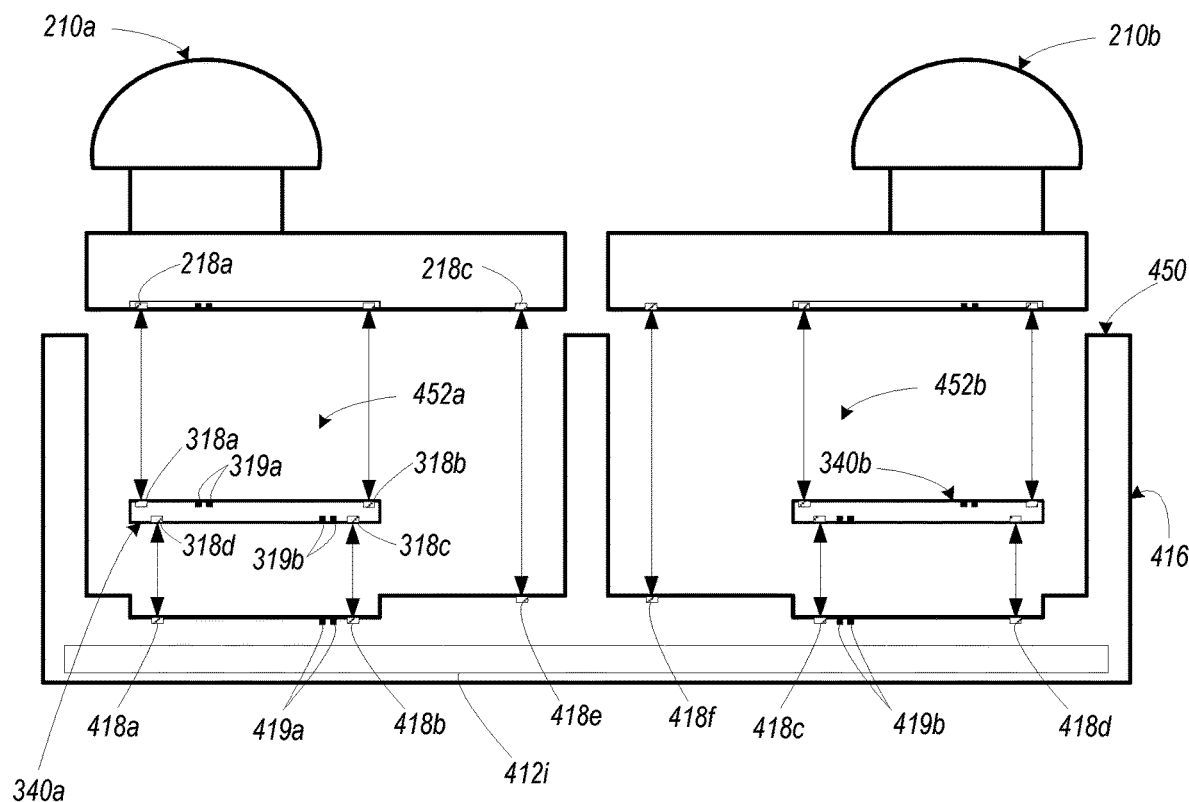
FIG. 5A is a side partial cutaway view of a pair of earbuds, charging adapters, and a charging case configured in accordance with aspects of the disclosed technology.
Figure 5B:
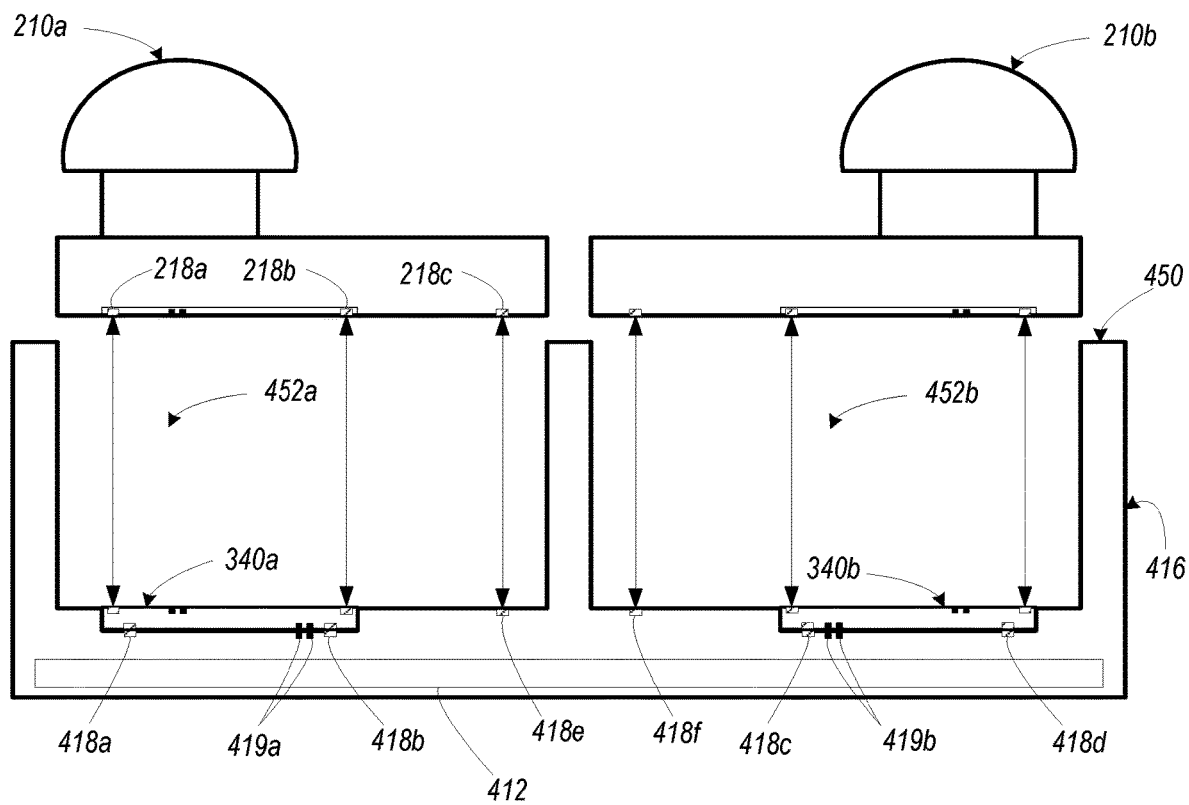
FIG. 5B is another side partial cutaway view of a pair of earbuds, charging adapters, and a charging case configured in accordance with aspects of the disclosed technology.
Figure 5C:
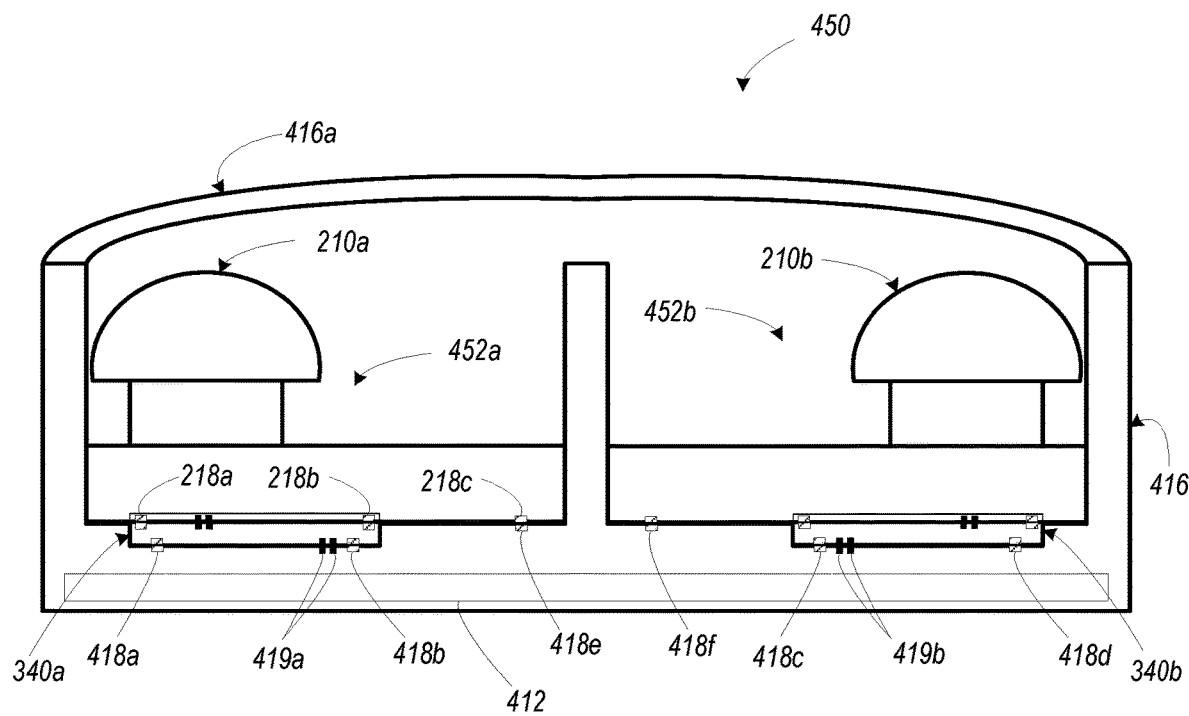
FIG. 5C is another side partial cutaway view of a pair of earbuds, charging adapters, and a charging case configured in accordance with aspects of the disclosed technology.

To illustrate, FIGS. 5A, 5B, and 5C illustrate example carrying of the earbuds 310a and 210b as well as the charging adapters 340a and 340b in the charging case 450a. FIG. 5A illustrates how the magnets 418a and 418b align with the magnets 318c and 318d of the charging adapter 340a. Further, as described above, the magnets 318a and 318b align with the magnets 218a and 218b of the earbud 210a. Yet further, one or more magnets 218c align with the one or more magnets 418e.

When the earbud 210a, the charging adapter 340a, and the charging case 450a are brought into proximity while keeping the magnets 218, 318, and 418 aligned, the magnets 218, 318, and 418 maintain the charging adapter 340a and earbud 210a within the first volume 452b. Corresponding magnets maintain the charging adapter 340b and earbud 210b within the second volume 452b.

To illustrate, FIG. 5B shows the charging adapters 340a and 340b carried in the first volume 452a and the second volume 452b. The charging adapters 340a and 340b are maintained in the first volume 452a and the second volume 452b via the magnets 318 and 418, as shown.

FIG. 5C shows the charging adapter 340a and the earbud 210a carried in the first volume 452a and the charging adapter 340b and the earbud 210b carried in the second volume 452b. The earbuds 210a and 210b and charging adapters 340a and 340b are maintained in the first volume 452a and the second volume 452b via the magnets 218, 318 and 418, as shown. A cover 416a may optionally be placed on or connected to the housing 416.

Figure 5D:
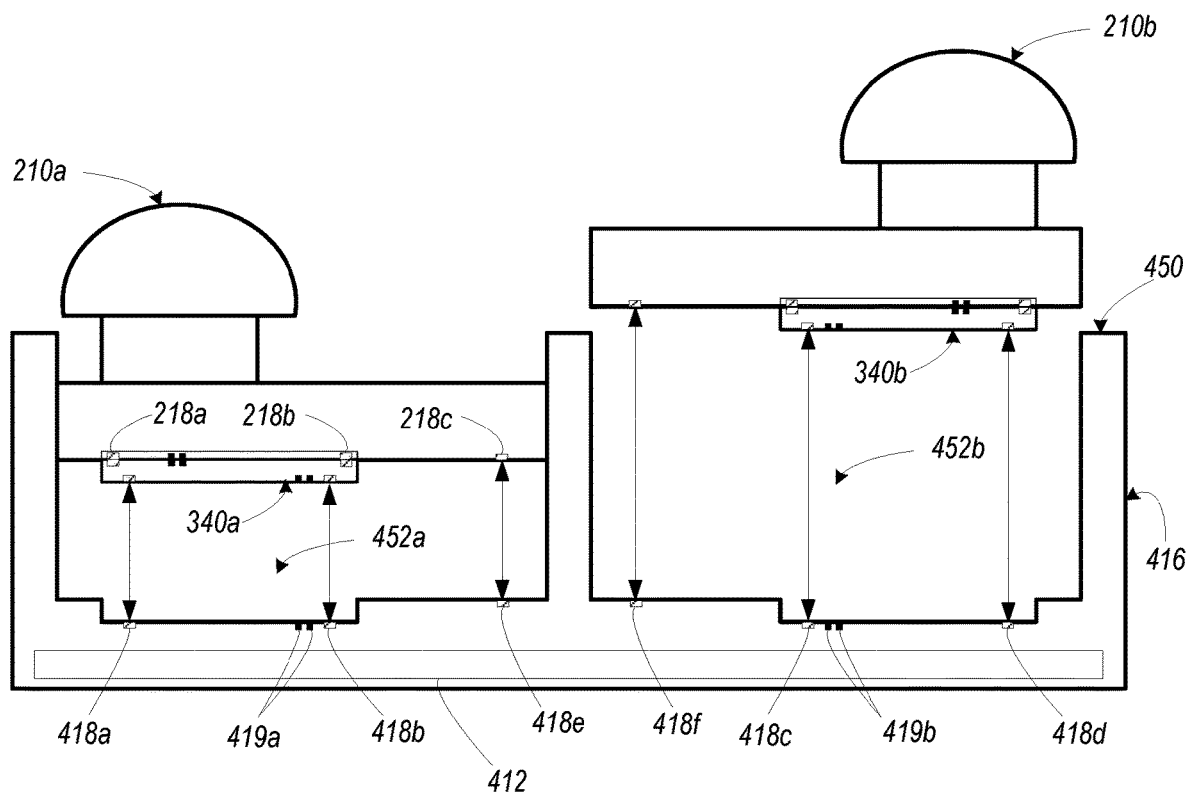
FIG. 5D is another side partial cutaway view of a pair of earbuds, charging adapters, and a charging case configured in accordance with aspects of the disclosed technology.

FIG. 5D illustrates how the earbud 210a and charging adapter 340a may be inserted into the charging case 450a while attached to one another. Similar, the earbud 210b and charging adapter 340b may be inserted into the charging case 450a while attached to one another. In some embodiments, the charging adapters 340a and 340b are interchangeable between the earbuds 310a and 310b. Further, in such examples, the charging adapters 340a and 340b may be carried in either the first volume 452a or the second volume 452b.

Carrying the earbuds 210a and 210b and charging adapters 340a and 340b as shown in FIGS. 5A, 5B, 5C, and 5D facilities charging of the earbuds 210a and 210b and/or the charging adapters 340a and 340b. In particular, when the charging adapter 340a is carried in the charging case 450a as shown in FIGS. 5B and 5C, the electrodes 319b of the charging adapter 340a align and contact the electrodes 419a of the charging case 450a. This allows the charging adapter 340a to draw current from the case batteries of the charging case 450a or wall power (e.g., if the charging case is connected to wall power). The charging adapter 340b may charge similarly using the electrodes 419b.

Similarly, when the earbud 210a is carried in the charging case 450a as shown in Figure the electrodes 319a of the charging adapter 340a align and contact the electrodes 218b of the charging case 450a. This allows the earbud 210a to draw current from the charging adapter 340a. In some embodiments, the earbud 210a charges from the adapter batteries of the charging adapter 340a (which may be concurrently or later recharged using the case batteries of the charging case 450a or wall power). Alternatively, the charging adapter 340a may direct current from the electrodes 419a through the electrodes 319b and 318a to the electrodes 218a of the earbud 210a. The earbud 210b may charge similarly when carried in the volume 252b.

Figure 6A:
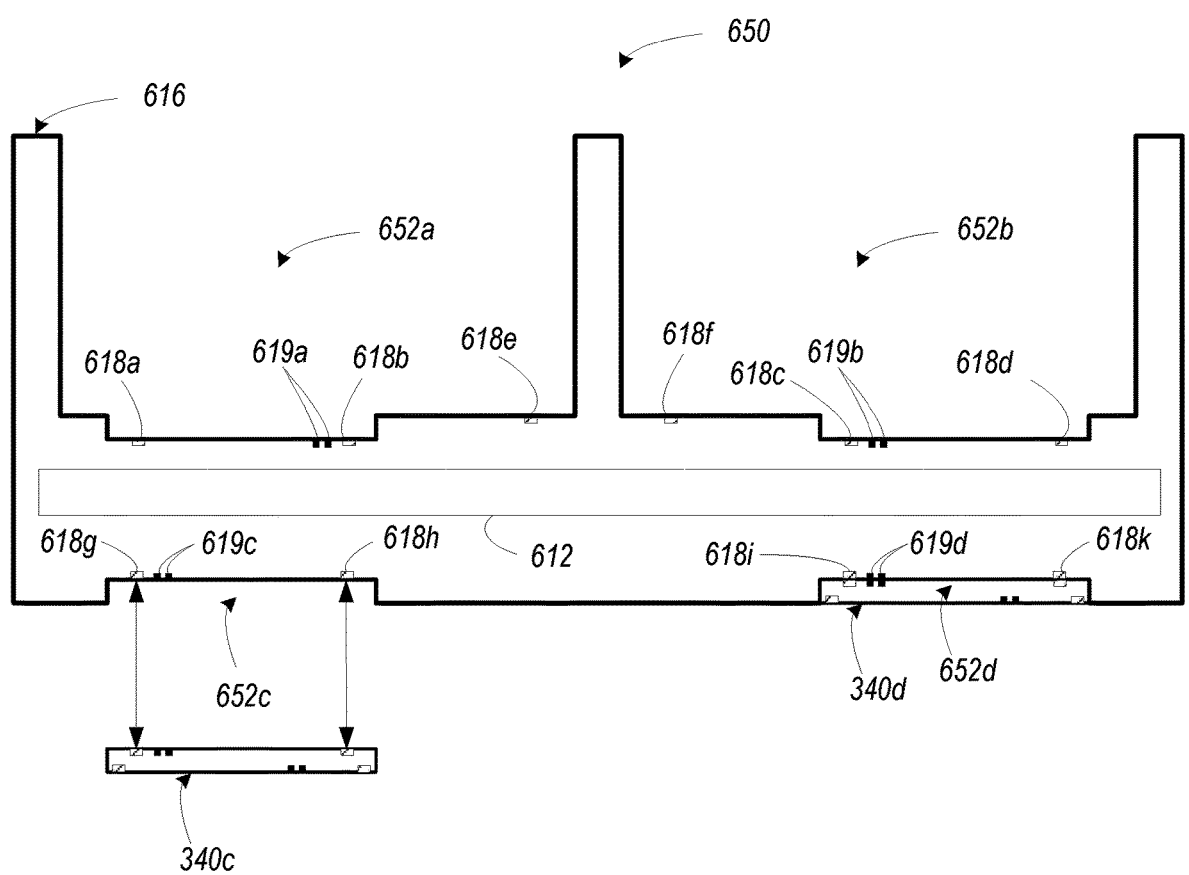
FIG. 6A is a side partial cutaway view of a pair of earbuds, charging adapters, and a charging case configured in accordance with aspects of the disclosed technology.

FIG. 6A shows another example charging case 650. Like the charging case 450, the charging case 650 includes a housing 616 carrying a power 612 that includes one or more case batteries. Further, the housing 616 forms a first volume 652a configured to carry the earbud 210a and the charging adapter 340a, as well as the corresponding electrodes 619a and magnets 618a, 618b, and 618e. Yet further, the housing 616 forms a second volume 652b configured to carry the earbud 210b and the charging adapter 340b, as well as the corresponding electrodes 619b and magnets 618c, 618d, and 618f.

In contrast to the charging case 450, the housing of the charging case 650 forms a third volume 652c and a fourth volume 652d. The third volume 652c is formed to carry a third charging adapter 340c while the fourth volume 652d is formed to carry a fourth charging adapter 340d. Magnets 618g and 618h maintain the third charging adapter 340c in the third volume 652. While the third charging adapter 340c is carried in the third volume 652c, the electrodes 619c align with and connect with electrodes of the third charging adapter 340c, allowing the third charging adapter 340c to charge from the case batteries or wall power. Similarly, magnets 618i and 618k maintain the fourth charging adapter 340d in the fourth volume 652d. While the fourth charging adapter 340d is carried in the third volume 652d, the electrodes 619d align with and connect with electrodes of the fourth charging adapter 340d, allowing the fourth charging adapter 340d to charge from the case batteries or wall power. If the charging adapters 340a and 340b become drained, a user can swap out the charging adapters 340c and 340d to continue charging the earbuds 210 without necessarily interrupting playback.

Figure 6B:
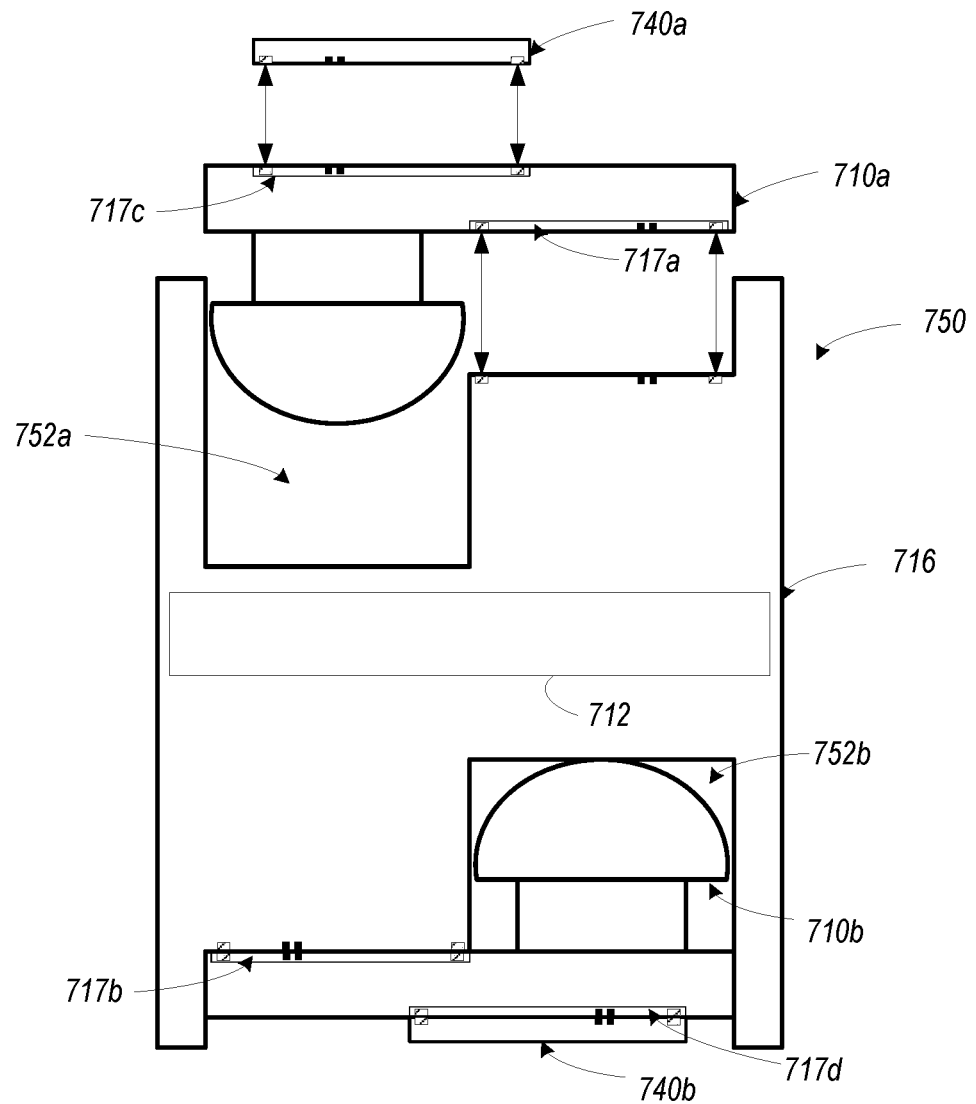
FIG. 6B is a side partial cutaway view of a pair of earbuds, charging adapters, and a charging case configured in accordance with aspects of the disclosed technology.

FIG. 6B shows a partial cutaway side view of a pair of earbuds 710 (labelled as earbud 710a and 710b), a first charging adapter 740a, a second charging adapter 740b, and a charging case 750. The earbuds 710, the charging adapters 740a and 740b, and the charging case 750 generally function similarly as the earbuds 210, charging adapters 340, and charging cases 450 and 650.

As shown in FIG. 6B, a housing 716 carries a power 712 that includes one or more case batteries. Further, the housing 716 of the charging case 750 forms a first volume 752a and a second volume 752b. The first volume 752a is configured to carry the earbud 710a while the second volume 752b is formed to carry the earbud 710b. Magnets in the housing 716 and/or a connection interface 717a of the earbud 710a maintain the earbud 710a in the first volume 752a. Similarly, magnets in the housing 716 and/or a connection interface 717b of the earbud 710b maintain the earbud 710b in the second volume 752b. Further, the magnets and the shape of the first volume 752a align electrodes of the connection interface 717a with corresponding electrodes in the housing 716, allowing the earbud 710a to charge from the case batteries of the power 712. The earbud 710b can likewise charge when carried in the second volume 752b, as shown.

Yet further, as also shown in FIG. 6B, the charging adapter 740a is attachable to the earbud 710a via a connection interface 717c. Similarly, the charging adapter 740b is attachable to the earbud 710b via a connection interface 717d. Each of the charging adapters 740a and 740b can charge the corresponding earbuds 710a and 710b when attached to the earbuds 710a and 710b (and not carried in the charging case 750). Further, each of the charging adapters 740a and 740b can be charged by the one or more case batteries (or wall power delivered through the charging case 750) via the earbud 710a or the earbud 710b (i.e., through the electrodes of the connection interfaces 717a and 717c or the connection interfaces 717b and 717d) when attached to the earbuds 710a and 710b (and the earbuds 710 are carried in the charging case 750).

In further embodiments, example earbuds utilize charging adapters as internal battery packs. In such examples, the charging adapters may be removable and swapped with (charged) charging adapters from the charging case. Other examples are possible as well.

Yet further, in some examples, example charging adapters may be attached to other portable playback devices, such as headphones. For instance, example headphones may include similar connection interfaces as the earbuds. By attaching a charging adapter to the headphones, internal batteries of the headphones may be charged from the adapter batteries of the charging adapter.

In further examples, the charging adapter may include an around the ear clip to support the additional mass of the charging adapter. In such examples, attaching the charging adapter to an earbud may arrange the ear clip to be supported by the ear lobe when the ear bud is inserted in the ear canal. Other examples are possible as well.

IV. Example Charging Techniques

Figure 7:
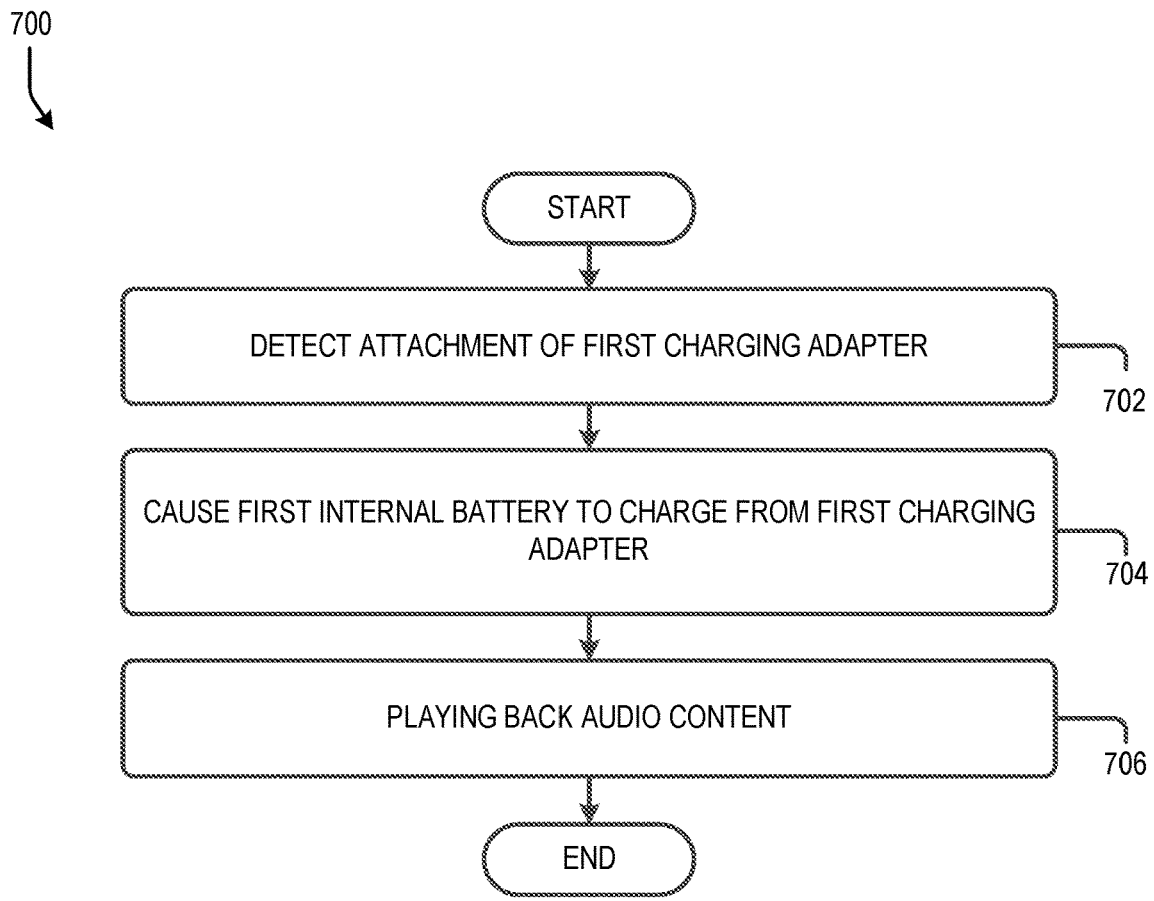
FIG. 7 is a flow diagram illustrating an example method to facilitate charging of one or more wireless earbuds in accordance with aspects of the disclosed technology.

FIG. 7 is a flow diagram showing an example method 700 facilitate charging of one or more wireless earbuds. The method 700 may be performed by an earbud, such as the earbud 210a (FIG. 2A). Alternatively, the method 700 may be performed by any suitable device or by a system of devices, such as a system comprising the pair of earbuds 710, among other examples.

At block 702, the method 700 includes detecting attachment of a first charging adapter to a magnetic interface. For instance, the earbud 210a may detect attachment of the charging adapter 340a using the magnets 218 and 318 (FIG. 3B) using the electronics 210 (FIG. 2A). As another example, the earbud 740a may detect attachment of the charging adapter 740a (FIG. 6B). In some examples, a second earbud (e.g., the earbud 210b) may detect attachment of a second charging adapter 340b.

At block 704, the method 700 includes causing a first internal battery to charge from the first charging adapter. For example, the earbud 210a may cause the internal battery in power 212i (FIG. 2A) to charge from the charging adapter 340a (FIG. 3D). Charging the first internal battery may involve drawing current from the one or more adapter batteries of the first charging adapter via the electrodes (e.g., the electrodes 219) of the magnetic connection interface and the electrodes of the first charging adapter (e.g., the electrodes 319) (FIG. 3D). In some examples, a second earbud (e.g., the earbud 210b) may cause a second internal battery to charge from a second charging adapter (e.g., the charging adapter 340b). When the first charging adapter 340a is detached from the magnetic interface, the earbud 210a stops charging.

At block 706, the method 700 includes playing back audio content. For instance, the earbud 210a, possibly in a stereo pair with another earbud (e.g., the earbud 210b), may play back audio content. Playing back audio content may involve streaming data representing audio from a remote source using the network interface 212d, processing the audio using the processors 212a and/or the audio processing components 212g, and outputting the audio using the transducers 214 (FIG. 2A). During playback, the components of the earbud 210a may be powered by the internal battery of the power 212i, which may be charging from the charging adapter.

In some cases, the method 700 further involves detecting that a battery level of the internal battery is below a threshold level. Based on such detecting, the earbud 210a may output an indication that the battery level is low. For instance, the earbud 210a may play back an audible notification that the battery level is low and that the user should attach a charging adapter to continue use of the earbud 210a.

V. Additional Examples

Figure 8A:
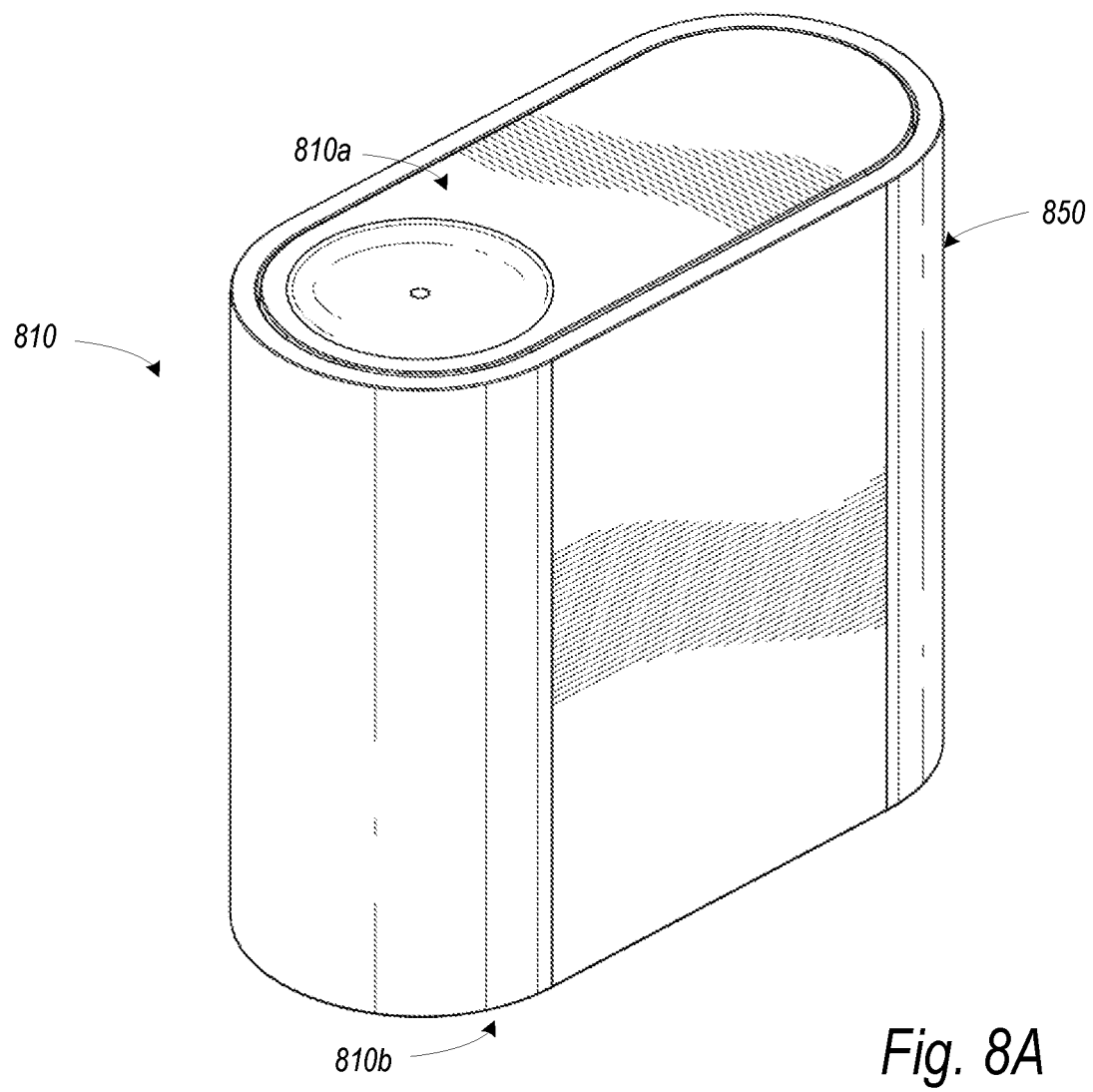
FIG. 8A is a front isometric view of earbuds configured in accordance with aspects of the disclosed technology.

FIG. 8A is a front isometric view of earbuds 810 including an earbud 810a and an earbud 810b configured in accordance with aspects of the disclosed technology. As shown, the earbuds 800 are carried in a charging case 850.

Figure 8B:
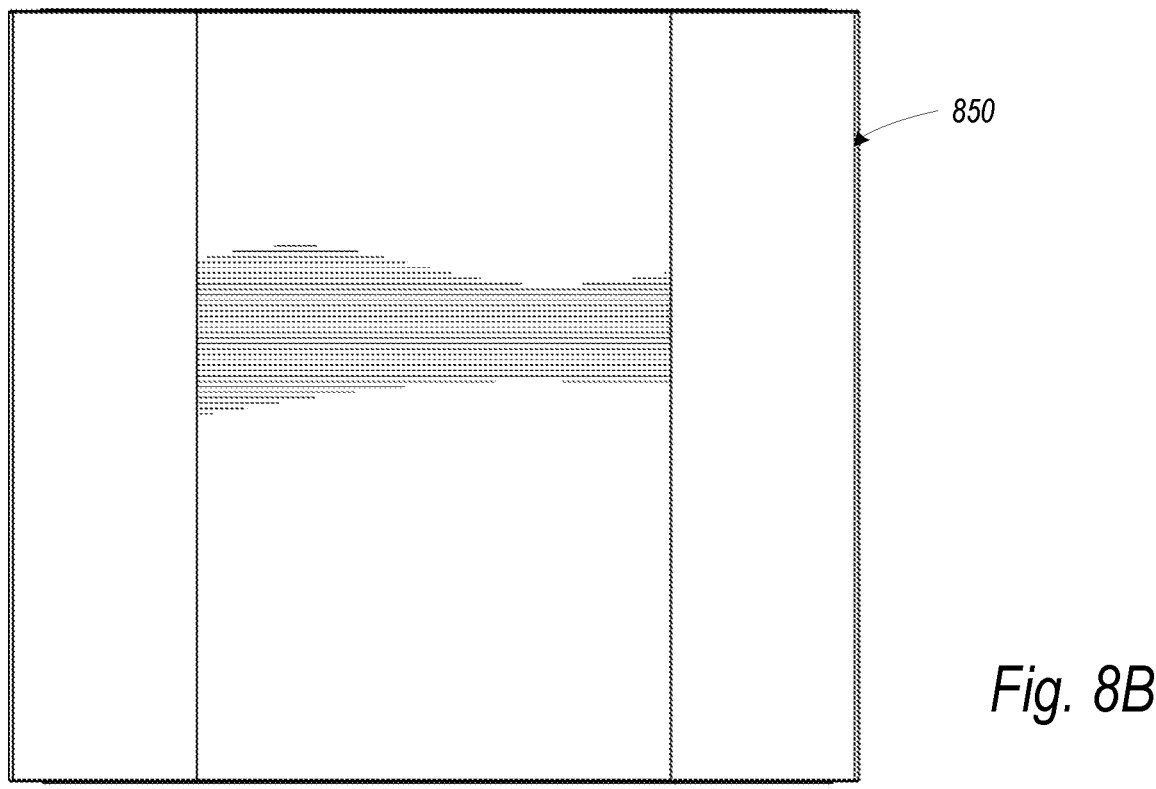
FIG. 8B is a bottom view of a charging case configured in accordance with aspects of the disclosed technology.
Figure 8C:
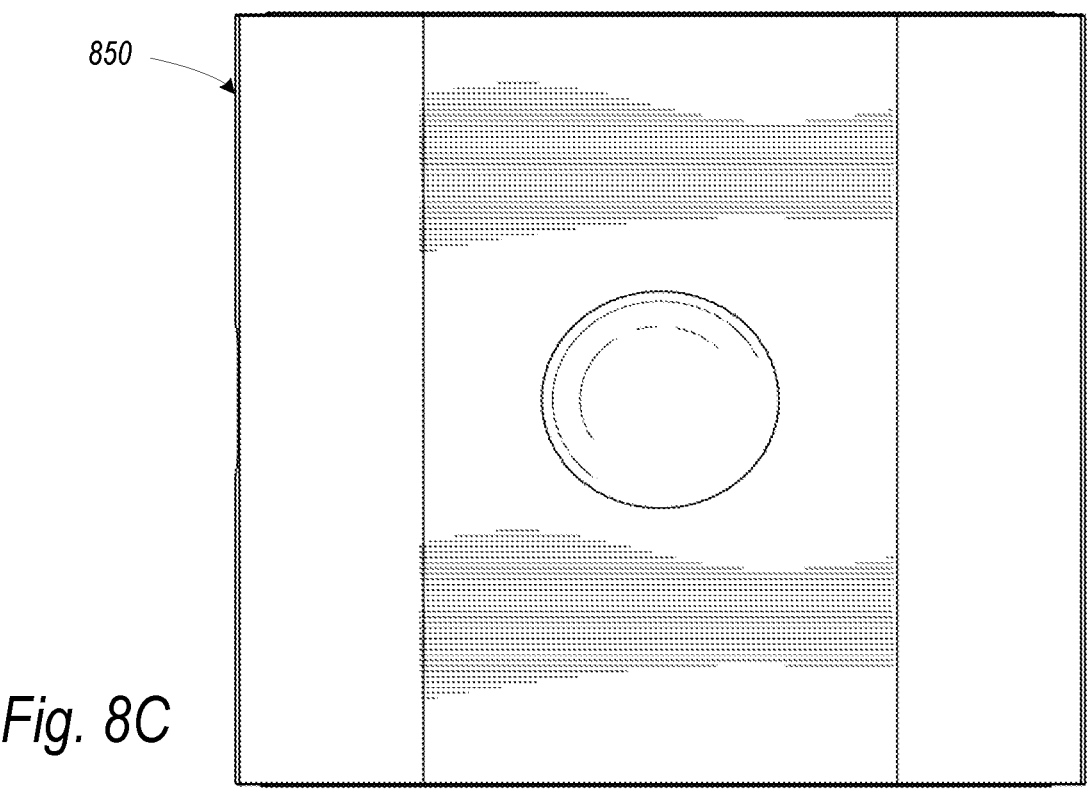
FIG. 8C is a top view of the charging case.
Figure 8D:
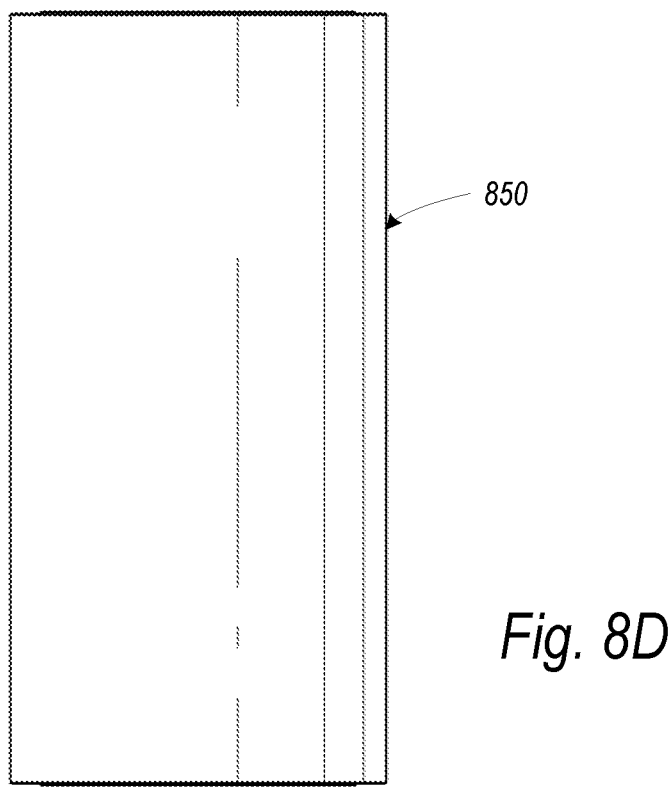
FIG. 8D is a first side view of the charging case.
Figure 8E:
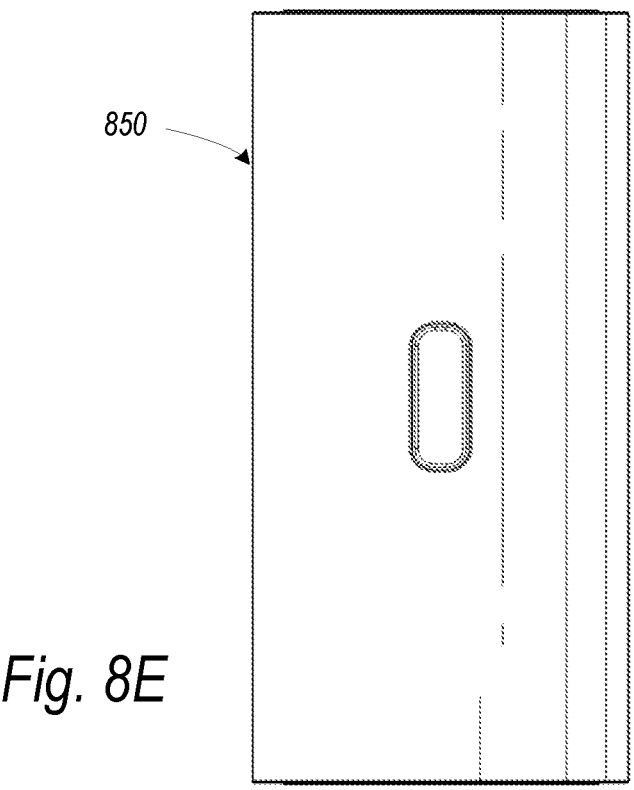
FIG. 8E is a second side view of the charging case.

FIG. 8B is a bottom view of the charging case 850.
FIG. 8C is a top view of the charging case 850.
FIG. 8D is a first side view of the charging case 850.
FIG. 8E is a second side view of the charging case 850.
FIG. 8F is a front isometric view of the earbud 810a and the earbud 810b illustrating exemplary arrangement with the charging case 850. A charging adapter 840a is attached to an exterior surface of the earbud 810a, as shown. Similarly, a charging adapter 840b is attached to an exterior surface of the earbud 810b, as also shown.

Figure 8G:
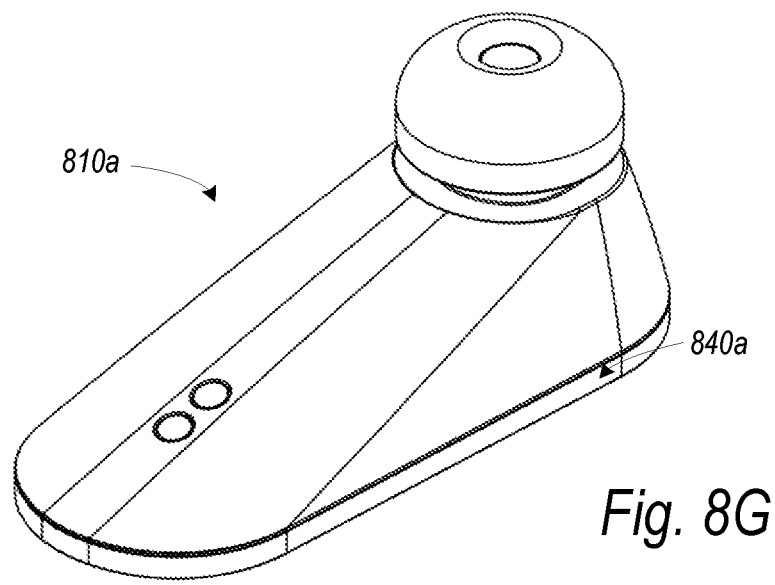
FIG. 8G is an isometric view of the earbud.
Figure 8H:
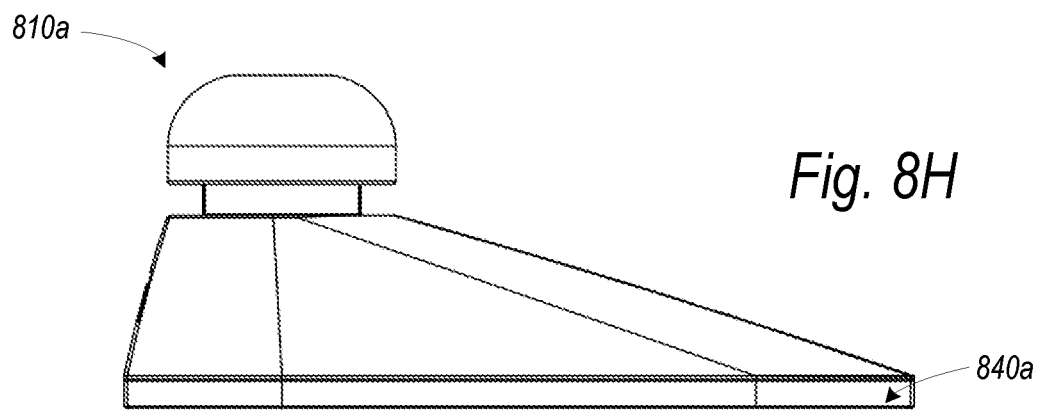
FIG. 8H is a first side view of the earbud.
Figure 8I:
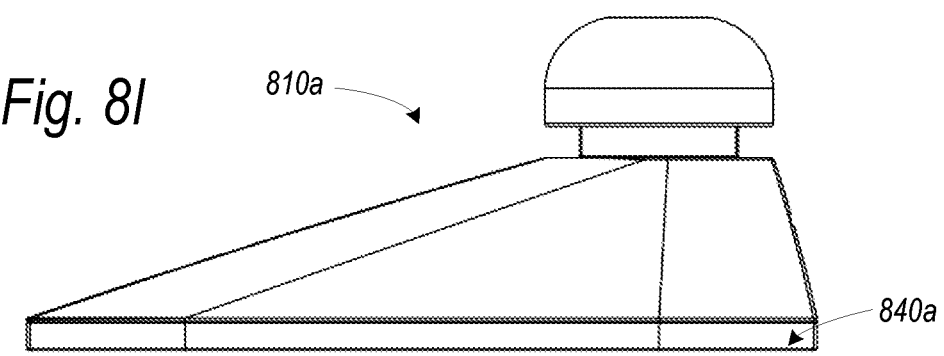
FIG. 8I is a second side view of the earbud.
Figure 8J:
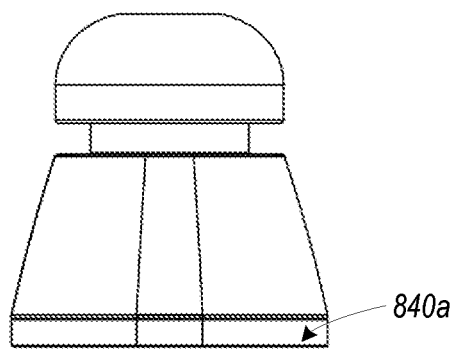
FIG. 8J is a third side view of the earbud.
Figure 8K:
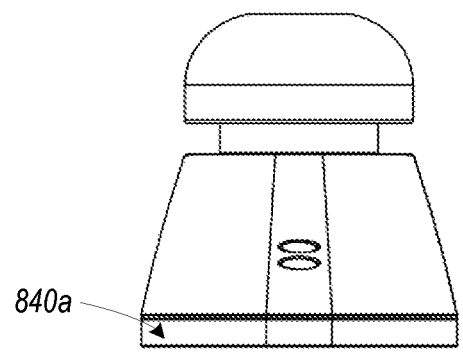
FIG. 8K is a fourth side view of the earbud.
Figure 8L:
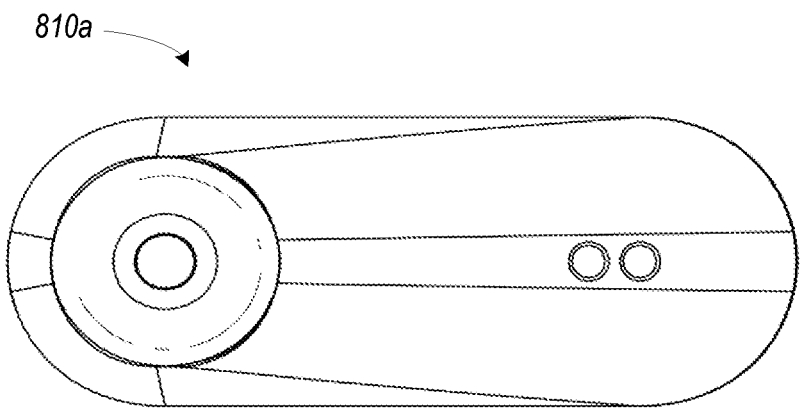
FIG. 8L is a fifth side view of the earbud.
Figure 8M:
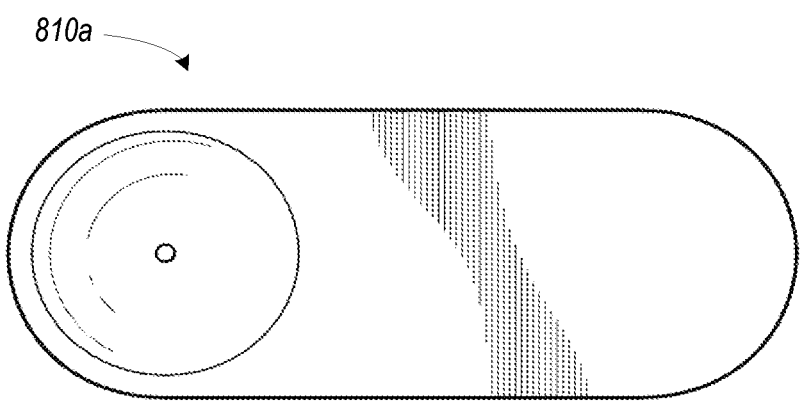
FIG. 8M is a sixth side view of the earbud.
Figure 9A:
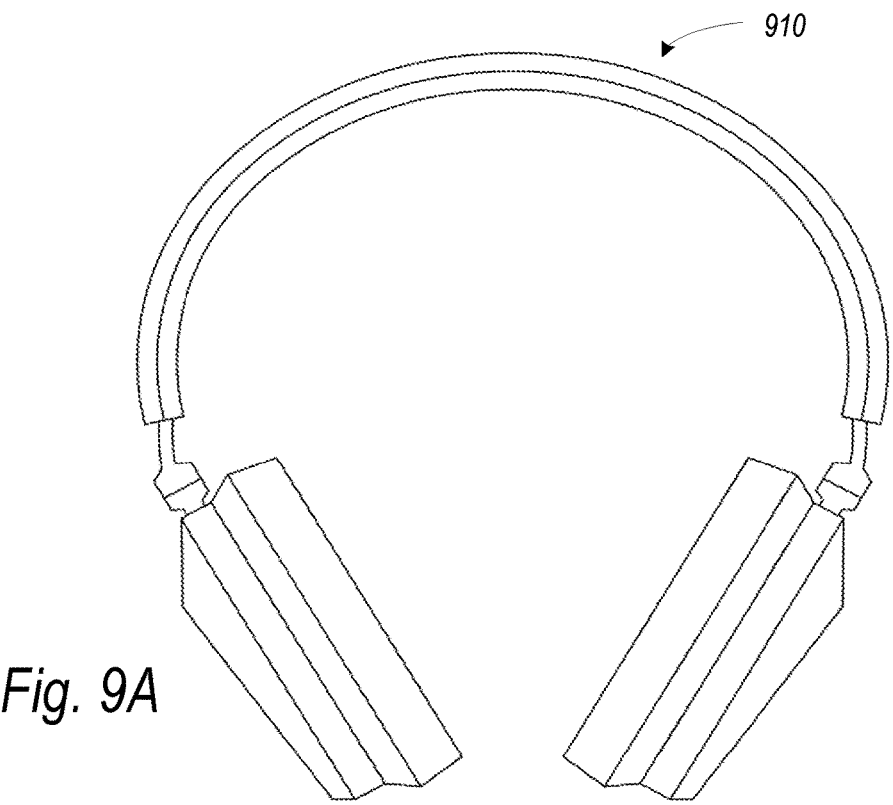
FIG. 9A is a front view of headphones configured in accordance with aspects of the disclosed technology.
Figure 9B:
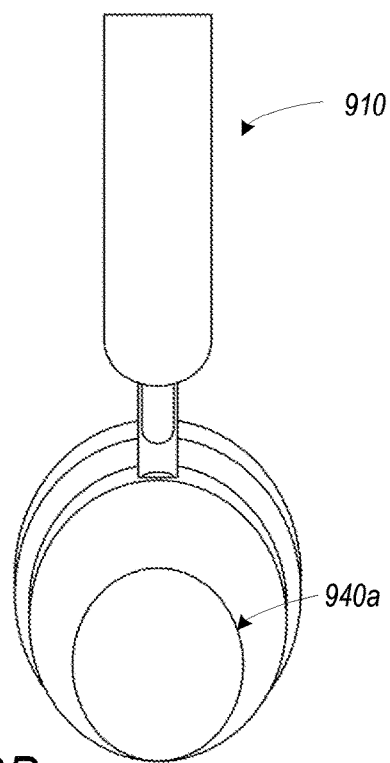
FIG. 9B is a first side view of the headphones.
Figure 9C:
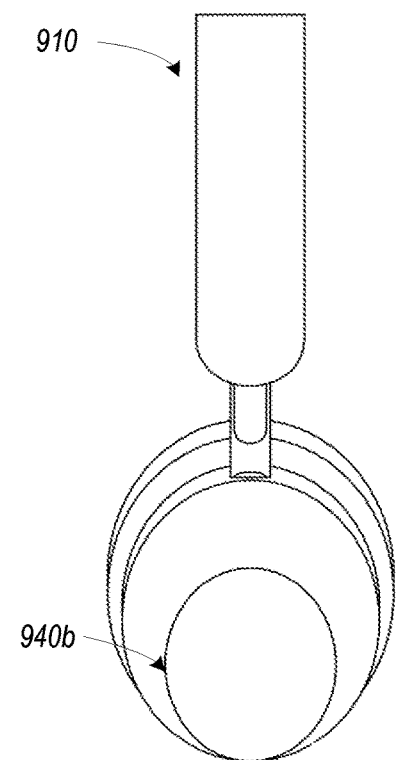
FIG. 9C is a second side view of the headphones.

FIG. 8G is an isometric view of the earbud 810a and the charging adapter 840a.
FIG. 8H is a first side view of the earbud 810a and the charging adapter 840a.
FIG. 8I is a second side view of the earbud 810a and the charging adapter 840a.
FIG. 8J is a third side view of the earbud 810a and the charging adapter 840a.
FIG. 8K is a fourth side view of the earbud 810a and the charging adapter 840a.
FIG. 8L is a fifth side view of the earbud 810a.
FIG. 8M is a sixth side view of the earbud 810a.
FIG. 9A is a front view of headphones 910 configured in accordance with aspects of the disclosed technology.
FIG. 9B is a first side view of the headphones 910. A charging adapter 940a is attached to a first exterior surface of the headphones 910, as shown.
FIG. 9B is a second side view of the headphones 910. A charging adapter 940b is attached to a second exterior surface of the headphones 910, as also shown.

VI. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A system comprising: a first charging adapter comprising one or more adapter batteries; and a first earbud, the first earbud comprising: a first IEEE 802.15-compatible interface; a first internal battery; a first audio driver; a housing carrying the first IEEE 802.15-compatible interface and the first internal battery, wherein the housing of the first earbud comprises: a first portion insertable into a first ear canal, the first portion carrying the first audio driver; and a second portion carrying a magnetic interface that includes one or more magnets that (i) attach the first charging adapter externally to the housing of the first earbud and (ii) align electrodes of the first charging adapter to electrodes of the magnetic interface; and a first controller carried in the housing of the first earbud and configured to perform functions comprising: detecting attachment of the first charging adapter to the magnetic interface; and based on detecting that the first charging adapter is attached to the magnetic interface, causing the first internal battery to charge from the first charging adapter, wherein charging the first internal battery comprises drawing current from the one or more adapter batteries of the first charging adapter via the electrodes of the magnetic connection interface and the electrodes of the first charging adapter.

Example 2: The system of example 1, further comprising: a second charging adapter comprising one or more adapter batteries; and a second earbud, the second earbud comprising: a second IEEE 802.15-compatible interface; a second internal battery; a second audio driver; a housing carrying the second IEEE 802.15-compatible interface and the second internal battery, wherein the housing of the second earbud comprises: a first portion insertable into a second ear canal, the first portion carrying the second audio driver; and a second portion carrying a magnetic interface that includes one or more magnets that (i) attach the second charging adapter externally to the housing of the second earbud and (ii) align electrodes of the second charging adapter to electrodes of the magnetic interface; a second controller carried in the housing of the second earbud and configured to perform functions comprising: detecting attachment of the second charging adapter to the magnetic interface; and based on detecting that the second charging adapter is attached to the magnetic interface, causing the second internal battery to charge from the second charging adapter, wherein charging the second internal battery comprises drawing current from the one or more adapter batteries of the second charging adapter via the electrodes of the magnetic connection interface and the electrodes of the second charging adapter.

Example 3: The system of example 2, further comprising a charging case, the charging case comprising: one or more case batteries; and a housing carrying the one or more case batteries, the housing comprising: a first portion forming a first volume shaped to carry the first charging adapter and the first earbud when the first charging adapter and the first earbud are attached; first electrodes arranged in the housing to contact the electrodes of the first charging adapter when the first charging adapter is carried in the housing of the charging case, wherein the one or more adapter batteries of the first charging adapter and the first internal battery of the first earbud charge from (a) the one or more case batteries when the charging case is disconnected from wall power or (b) wall power when the charging case is connected to wall power, and wherein the first earbud draws current via the electrodes of the magnetic connection interface and the electrodes of the first charging adapter; a second portion forming a second volume shaped to carry the second charging adapter and the second earbud when the second charging adapter and the second earbud are attached; and second electrodes arranged in the housing to contact the electrodes of the second charging adapter when the second charging adapter is carried in the housing of the charging case, wherein the one or more adapter batteries of the second charging adapter and the second internal battery of the second earbud charge from (a) the one or more case batteries when the charging case is disconnected from wall power or (b) wall power when the charging case is connected to wall power, and wherein the second earbud draws current via the electrodes of the magnetic connection interface and the electrodes of the second charging adapter.

Example 4: The system of example 3, further comprising: a third charging adapter substantially similar to the first charging adapter; and a fourth charging adapter substantially similar to the second charging adapter, wherein the housing of the charging case further comprises: a third portion forming a third volume shaped to carry the third charging adapter; third electrodes arranged in the housing to contact electrodes of the third charging adapter when the third charging adapter is carried in the housing of the charging case, wherein one or more adapter batteries of the third charging adapter charge from (a) the one or more case batteries when the charging case is disconnected from wall power or (b) wall power when the charging case is connected to wall power; a fourth portion forming a fourth volume shaped to carry the fourth charging adapter; and fourth electrodes arranged in the housing to contact electrodes of the fourth charging adapter when the fourth charging adapter is carried in the housing of the charging case, wherein one or more adapter batteries of the fourth charging adapter charge from (a) the one or more case batteries when the charging case is disconnected from wall power or (b) wall power when the charging case is connected to wall power.

Example 5: The system of example 3, wherein the charging case further comprises (i) one or more coils, wherein a wireless charger induces a current in the one or more coils to wirelessly charge the one or more case batteries from wall power connected to the wireless charger and (ii) a cable port, wherein a cable connected between the cable port and a wall charger delivers current to charge the one or more case batteries from wall power connected to the wall charger.

Example 6: The system of example 2, further comprising a charging case, the charging case comprising: one or more case batteries; and a housing carrying the one or more case batteries, the housing comprising: a first portion forming a first volume shaped to carry the first earbud; first electrodes arranged in the housing to contact the electrodes of the first earbud when the first earbud is carried in the housing of the charging case, wherein the first internal battery of the first earbud charges from (a) the one or more case batteries when the charging case is disconnected from wall power or (b) wall power when the charging case is connected to wall power; a second portion forming a second volume shaped to carry the first charging adapter; and second electrodes arranged in the housing to contact the electrodes of the first charging adapter when the first charging adapter is carried in the housing of the charging case, wherein the one or more adapter batteries of the first charging adapter charge from (a) the one or more case batteries when the charging case is disconnected from wall power or (b) wall power when the charging case is connected to wall power; a third portion forming a third volume shaped to carry the second earbud; third electrodes arranged in the housing to contact the electrodes of the second earbud when second earbud is carried in the housing of the charging case, wherein the second internal battery of the second earbud charges from (a) the one or more case batteries when the charging case is disconnected from wall power or (b) wall power when the charging case is connected to wall power; a fourth portion forming a fourth volume shaped to carry the second charging adapter; and fourth electrodes arranged in the housing to contact the electrodes of the second charging adapter when the second charging adapter is carried in the housing of the charging case, wherein the one or more adapter batteries of the second charging adapter charge from (a) the one or more case batteries when the charging case is disconnected from wall power or (b) wall power when the charging case is connected to wall power.

Example 7: The system of example 5, further comprising: a third charging adapter substantially similar to the first charging adapter; and a fourth charging adapter substantially similar to the second charging adapter, wherein the housing of the charging case further comprises: a fifth portion forming a fifth volume shaped to carry the third charging adapter; fifth electrodes arranged in the housing to contact electrodes of the third charging adapter when the third charging adapter is carried in the housing of the charging case, wherein one or more adapter batteries of the third charging adapter charge from (a) the one or more case batteries when the charging case is disconnected from wall power or (b) wall power when the charging case is connected to wall power; a sixth portion forming a sixth volume shaped to carry the fourth charging adapter; and sixth electrodes arranged in the housing to contact electrodes of the fourth charging adapter when the fourth charging adapter is carried in the housing of the charging case, wherein one or more adapter batteries of the fourth charging adapter charge from (a) the one or more case batteries when the charging case is disconnected from wall power or (b) wall power when the charging case is connected to wall power.

Example 8: The system of example 2, wherein the first charging adapter and the second charging adapter are interchangeable between the first earbud and the second earbud.

Example 9: The system of example 8, wherein the housings of the first charging adapter and the second charging adapter are substantially coin-shaped Example 10: The system of example 2, wherein the first internal battery of the first earbud and the second internal battery of the second earbud are removeable, wherein the first charging adapter is swappable with the first internal battery, and wherein the second charging adapter is swappable with the second internal battery.

Example 11: The system of example 1, wherein the system further comprises wireless headphones, the wireless headphones comprising: a third IEEE 802.15-compatible interface; a third internal battery; two or more third audio drivers; a housing carrying the first IEEE 802.15-compatible interface and the first internal battery, wherein the housing of the wireless headphones comprises: a first portion carrying a magnetic interface that includes one or more magnets that (i) attach the first charging adapter externally to the housing of the wireless headphones and (ii) align electrodes of the first charging adapter to electrodes of the magnetic interface.

Example 12: A first charging adapter comprising: one or more adapter batteries; and a housing carrying the one or more adapter batteries and a magnetic interface that includes one or more magnets that (i) attach the first charging adapter externally to a housing of a first earbud and (ii) align electrodes of the first charging adapter to electrodes of the first earbud, wherein a first internal battery of the first earbud charges from the first charging adapter when the first charging adapter is attached to the housing of the first earbud via the magnetic interface, wherein the first earbud draws current from the one or more adapter batteries of the first charging adapter via the electrodes of the magnetic connection interface and the electrodes of the first earbud.

Example 13: The first charging adapter of example 12, wherein the housing of the first charging adapter is formed to be carried within a volume in a housing of a charging case, wherein the electrodes of the first charging adapter contact first electrodes arranged in the housing of the charging case when the first charging adapter is carried in the housing of the charging case, and wherein the one or more adapter batteries of the first charging adapter and the first internal battery of the first earbud charge from (a) one or more case batteries of the charging case when the charging case is disconnected from wall power or (b) wall power when the charging case is connected to wall power, and wherein the first earbud draws current via the electrodes of the magnetic connection interface and the electrodes of the first earbud.

Example 14: The first charging adapter of example 12, wherein the housing of the first charging adapter is formed to be carried within a volume in a housing of a charging case, wherein the electrodes of the first charging adapter contact first electrodes arranged in the housing of the charging case when the first charging adapter is carried in the housing of the charging case, and wherein the one or more adapter batteries of the first charging adapter charge from (a) one or more case batteries of the charging case when the charging case is disconnected from wall power or (b) wall power when the charging case is connected to wall power, and wherein the first charging adapter draws current via the electrodes of the magnetic interface and the first electrodes arranged in the housing of the charging case.

Example 15: The first charging adapter of example 12, wherein the housing of the first charging adapter is substantially coin-shaped.

Example 16: The first charging adapter of example 12, wherein the first internal battery of the first earbud is removeable, and wherein the first charging adapter is swappable with the first internal battery.

Example 17: A pair of wireless earbuds comprising a first earbud and a second earbud, the first earbud comprising: a first IEEE 802.15-compatible interface; a first internal battery; a first audio driver; a housing carrying the first IEEE 802.15-compatible interface and the first internal battery, wherein the housing of the first earbud comprises: a first portion insertable into a first ear canal, the first portion carrying the first audio driver; and a second portion carrying a magnetic interface that includes one or more magnets that (i) attach a first charging adapter externally to the housing of the first earbud and (ii) align electrodes of the first charging adapter to electrodes of the magnetic interface; and a first controller carried in the housing of the first earbud and configured to perform functions comprising: detecting attachment of the first charging adapter to the magnetic interface; and based on detecting that the first charging adapter is attached to the magnetic interface, causing the first internal battery to charge from the first charging adapter, wherein charging the first internal battery comprises drawing current from one or more adapter batteries of the first charging adapter via the electrodes of the magnetic connection interface and the electrodes of the first charging adapter; and the second earbud comprising: a second IEEE 802.15-compatible interface; a second internal battery; a second audio driver; a housing carrying the second IEEE 802.15-compatible interface and the second internal battery, wherein the housing of the second earbud comprises: a first portion insertable into a second ear canal, the first portion carrying the second audio driver; and a second portion carrying a magnetic interface that includes one or more magnets that (i) attach a second charging adapter externally to the housing of the second earbud and (ii) align electrodes of the second charging adapter to electrodes of the magnetic interface; a second controller carried in the housing of the second earbud and configured to perform functions comprising: detecting attachment of the second charging adapter to the magnetic interface; and based on detecting that the second charging adapter is attached to the magnetic interface, causing the second internal battery to charge from the second charging adapter, wherein charging the second internal battery comprises drawing current from one or more adapter batteries of the second charging adapter via the electrodes of the magnetic connection interface and the electrodes of the second charging adapter.

Example 18: The pair of wireless earbuds of example 17, wherein: the housing of the first earbud is formed to be carried within a first volume in a housing of a charging case while attached to the first charging adapter, wherein the electrodes of the first charging adapter contact first electrodes arranged in the housing of the charging case when the first charging adapter is carried in the housing of the charging case, and wherein the one or more adapter batteries of the first charging adapter and the first internal battery of the first earbud charge from (a) one or more case batteries of the charging case when the charging case is disconnected from wall power or (b) wall power when the charging case is connected to wall power, and wherein the first earbud draws current via the electrodes of the magnetic connection interface and the electrodes of the first charging adapter; and the housing of the second earbud is formed to be carried within a second volume in the housing of the charging case while attached to the second charging adapter, wherein the electrodes of the second charging adapter contact second electrodes arranged in the housing of the charging case when the second charging adapter is carried in the housing of the charging case, and wherein the one or more adapter batteries of the second charging adapter and the second internal battery of the second earbud charge from (a) the one or more case batteries of the charging case when the charging case is disconnected from wall power or (b) wall power when the charging case is connected to wall power, and wherein the second earbud draws current via the electrodes of the magnetic connection interface and the electrodes of the second charging adapter.

Example 19: The pair of wireless earbuds of example 17, wherein: the housing of the first earbud is formed to be carried within a first volume in a housing of a charging case while attached to the first charging adapter, wherein the electrodes of the first charging adapter contact first electrodes arranged in the housing of the charging case when the first charging adapter is carried in the housing of the charging case, and wherein the one or more adapter batteries of the first charging adapter and the first internal battery of the first earbud charge from (a) one or more case batteries of the charging case when the charging case is disconnected from wall power or (b) wall power when the charging case is connected to wall power, and wherein the first earbud draws current via the electrodes of the magnetic connection interface and the electrodes of the first charging adapter; and the housing of the second earbud is formed to be carried within a second volume in the housing of the charging case while attached to the second charging adapter, wherein the electrodes of the second charging adapter contact second electrodes arranged in the housing of the charging case when the second charging adapter is carried in the housing of the charging case, and wherein the one or more adapter batteries of the second charging adapter and the second internal battery of the second earbud charge from (a) the one or more case batteries of the charging case when the charging case is disconnected from wall power or (b) wall power when the charging case is connected to wall power, and wherein the second earbud draws current via the electrodes of the magnetic connection interface and the electrodes of the second charging adapter.

Example 20: The pair of wireless earbuds of example 17, wherein the first charging adapter and the second charging adapter are interchangeable between the first earbud and the second earbud.

Example 21: The pair of wireless earbuds of example 17, wherein the first internal battery of the first earbud and the second internal battery of the second earbud are removeable, wherein the first charging adapter is swappable with the first internal battery, and wherein the second charging adapter is swappable with the second internal battery.

Example 22: A charging case comprising: one or more case batteries; and a housing carrying the one or more case batteries, the housing comprising: a first portion forming a first volume shaped to carry a first charging adapter and a first earbud when the first charging adapter and the first earbud are attached; first electrodes arranged in the housing to contact electrodes of the first charging adapter when the first charging adapter is carried in the housing of the charging case, wherein one or more adapter batteries of the first charging adapter and a first internal battery of the first earbud charge from (a) the one or more case batteries when the charging case is disconnected from wall power or (b) wall power when the charging case is connected to wall power, and wherein the first earbud draws current via the electrodes of the magnetic connection interface and the electrodes of the first charging adapter; a second portion forming a second volume shaped to carry a second charging adapter and a second earbud when the second charging adapter and the second earbud are attached; and second electrodes arranged in the housing to contact electrodes of the second charging adapter when the second charging adapter is carried in the housing of the charging case, wherein one or more adapter batteries of the second charging adapter and a second internal battery of the second earbud charge from (a) the one or more case batteries when the charging case is disconnected from wall power or (b) wall power when the charging case is connected to wall power, and wherein the second earbud draws current via the electrodes of the magnetic connection interface and the electrodes of the second charging adapter.

Example 23: The charging case of example 22, further comprising: a third portion forming a third volume shaped to carry a third charging adapter; third electrodes arranged in the housing to contact electrodes of the third charging adapter when the third charging adapter is carried in the housing of the charging case, wherein one or more adapter batteries of the third charging adapter charge from (a) the one or more case batteries when the charging case is disconnected from wall power or (b) wall power when the charging case is connected to wall power; a fourth portion forming a fourth volume shaped to carry a fourth charging adapter; and fourth electrodes arranged in the housing to contact electrodes of the fourth charging adapter when the fourth charging adapter is carried in the housing of the charging case, wherein one or more adapter batteries of the fourth charging adapter charge from (a) the one or more case batteries when the charging case is disconnected from wall power or (b) wall power when the charging case is connected to wall power.

Example 24: The charging case of example 22, wherein the charging case further comprises (i) one or more coils, wherein a wireless charger induces a current in the one or more coils to wirelessly charge the one or more case batteries from wall power connected to the wireless charger and (ii) a cable port, wherein a cable connected between the cable port and a wall charger delivers current to charge the one or more case batteries from wall power connected to the wall charger.

The invention claimed is:

1. A system comprising:
   a first charging adapter comprising one or more first adapter batteries;
   a second charging adapter comprising one or more second adapter batteries;
   a first earbud, the first earbud comprising:
   a first IEEE 802.15-compatible interface;
   a first internal battery;
   a first audio driver;
   a housing carrying the first IEEE 802.15-compatible interface and the first internal battery, wherein the housing of the first earbud comprises:
   a first portion insertable into a first ear canal, the first portion carrying the first audio driver; and
   a second portion comprising:
   a magnetic interface that is configured to (i) attach the first charging adapter externally to the housing of the first earbud and (ii) align electrodes of the first charging adapter to first electrodes of the first earbud; and
   second electrodes; and
   a first controller carried in the housing of the first earbud and configured to cause the first internal battery to charge from the first charging adapter when the first charging adapter is attached to the magnetic interface, wherein the first internal battery draws current from the one or more first adapter batteries of the first charging adapter via the electrodes of the magnetic interface and the electrodes of the first charging adapter during charging from the first charging adapter;
   a second earbud, the second earbud comprising:
   a second IEEE 802.15-compatible interface;
   a second internal battery;
   a second audio driver;
   a housing carrying the second IEEE 802.15-compatible interface and the second internal battery, wherein the housing of the second earbud comprises:
   a first portion insertable into a second ear canal, the first portion carrying the second audio driver; and
   a second portion comprising:
   a magnetic interface that is configured to (i) attach the second charging adapter externally to the housing of the second earbud and (ii) align electrodes of the second charging adapter to first electrodes of the first earbud; and
   second electrodes; and
   a second controller carried in the housing of the second earbud and configured to cause the second internal battery to charge from the second charging adapter when the second charging adapter is attached to the magnetic interface, wherein the second internal battery draws current from the one or more second adapter batteries of the second charging adapter via the electrodes of the magnetic interface and the electrodes of the second charging adapter during charging from the second charging adapter.

2. The system of claim 1, further comprising a charging case, the charging case comprising:
   one or more case batteries; and
   a housing carrying the one or more case batteries, the housing comprising:
   a first portion forming a first volume shaped to carry the first earbud;
   a first magnetic interface that is configured to (i) attach the first earbud to the charging case within the first volume and (ii) align first electrodes of the charging case to the second electrodes of the first earbud, wherein the one or more first adapter batteries of the first charging adapter and the first internal battery of the first earbud charge from (a) the one or more case batteries when the charging case is disconnected from wall power or (b) wall power when the charging case is connected to wall power, and wherein the first earbud draws current via the first electrodes of the charging case and the second electrodes of the first earbud;
   a second portion forming a second volume shaped to carry the second earbud; and
   a second magnetic interface that is configured to (i) attach the second earbud to the charging case within the second volume and (ii) align second electrodes of the charging case to the second electrodes of the second earbud, wherein the one or more second adapter batteries of the second charging adapter and the second internal battery of the second earbud charge from (a) the one or more case batteries when the charging case is disconnected from wall power or (b) wall power when the charging case is connected to wall power, and wherein the second earbud draws current via the second electrodes of the charging case and the second electrodes of the second earbud.

3. The system of claim 2, wherein the first volume of the charging case comprises a first portion shaped to carry the first portion of the first earbud and a second portion shaped to carry the second portion of the first earbud, and wherein the second volume of the charging case comprises a first portion shaped to carry the first portion of the second earbud and a second portion shaped to carry the second portion of the second earbud.

4. The system of claim 3, wherein the first magnetic interface of the charging case is disposed within the second portion of the first volume, and wherein the second magnetic interface of the charging case is disposed within the second portion of the second volume.

5. The system of claim 2, wherein the first volume of the charging case is shaped to carry the first charging adapter and the first earbud while the first charging adapter is attached to the first earbud via the magnetic interface of the first earbud, and wherein the second volume of the charging case is shaped to carry the second charging adapter and the second earbud while the second charging adapter is attached to the second earbud via the magnetic interface of the second earbud.

6. The system of claim 2, wherein the housing of the charging case is substantially rectangular, and wherein the first volume is formed on a first side of the housing and wherein the second volume is formed on a second side of the housing that is opposite of the first side.

7. The system of claim 2, wherein the housing of the charging case is substantially rectangular, and wherein the first volume is formed on a particular side of the housing and wherein the second volume is formed on the particular side of the housing adjacent to the first volume.

8. The system of claim 2, further comprising:
a third charging adapter comprising one or more third adapter batteries, wherein the housing of the charging case further comprises:
a third portion forming a third volume shaped to carry the third charging adapter; and
a third magnetic interface that is configured to (i) attach the third charging adapter to the charging case within the third volume and (ii) align third electrodes of the charging case to electrodes of the third charging adapter.

9. The system of claim 8, further comprising:
a fourth charging adapter comprising one or more fourth adapter batteries; wherein the housing of the charging case further comprises:
a fourth portion forming a fourth volume shaped to carry the fourth charging adapter; and
a fourth magnetic interface that is configured to (i) attach the fourth charging adapter to the charging case within the fourth volume and (ii) align fourth electrodes of the charging case to electrodes of the fourth charging adapter.

10. The system of claim 2, wherein the charging case further comprises (i) one or more coils, wherein a wireless charger induces a current in the one or more coils to wirelessly charge the one or more case batteries from wall power connected to the wireless charger and (ii) a cable port, wherein a cable connected between the cable port and a wall charger delivers current to charge the one or more case batteries from wall power connected to the wall charger.

11. The system of claim 1, wherein the first charging adapter and the second charging adapter are interchangeable between the first earbud and the second earbud.

12. A wearable playback device comprising:
a first earbud, the first earbud comprising:
a first IEEE 802.15-compatible interface;
a first internal battery;
a first audio driver;
a housing carrying the first IEEE 802.15-compatible interface and the first internal battery, wherein the housing of the first earbud comprises:
a first portion insertable into a first ear canal, the first portion carrying the first audio driver; and
a second portion comprising:
a first magnetic interface that is configured to (i) attach a first charging adapter externally to the housing of the first earbud and (ii) align electrodes of the first charging adapter to first electrodes of the first earbud; and
a second magnetic interface that is configured to (i) attach the first earbud to a charging case and (ii) align second electrodes of the first earbud to first electrodes of the charging case; and
a first controller carried in the housing of the first earbud and configured to cause the first internal battery to charge from the first charging adapter when the first charging adapter is attached to the first magnetic interface, wherein the first internal battery draws current from one or more adapter batteries of the first charging adapter via the electrodes of the first magnetic interface and the electrodes of the first charging adapter during charging from the first charging adapter;
a second earbud, the second earbud comprising:
a second IEEE 802.15-compatible interface;
a second internal battery;
a second audio driver;
a housing carrying the second IEEE 802.15-compatible interface and the second internal battery, wherein the housing of the second earbud comprises:
a first portion insertable into a second ear canal, the first portion carrying the second audio driver; and
a second portion comprising:
a first magnetic interface that is configured to (i) attach a second charging adapter externally to the housing of the second earbud and (ii) align electrodes of the second charging adapter to first electrodes of the first earbud; and
a second magnetic interface that is configured to (i) attach the second earbud to the charging case and (ii) align second electrodes of the second earbud to second electrodes of the charging case; and
a second controller carried in the housing of the second earbud and configured to cause the second internal battery to charge from the second charging adapter when the second charging adapter is attached to the second magnetic interface, wherein the second internal battery draws current from one or more adapter batteries of the second charging adapter via the electrodes of the second magnetic interface and the electrodes of the second charging adapter during charging from the second charging adapter.

13. The wearable playback device of claim 12, wherein the first controller is configured to:
cause the first internal battery to charge from the charging case when the first earbud is attached to the charging case via the second magnetic interface of the first earbud; and
cause the second internal battery to charge from the charging case when the second earbud is attached to the charging case via the second magnetic interface of the second earbud.

14. The wearable playback device of claim 12, wherein the first controller is configured to:
cause the first charging adapter to charge when (i) the first charging adapter is attached to the first earbud via the first magnetic interface of the first earbud and (ii) the first earbud is attached to the charging case via the second magnetic interface of the first earbud; and
cause the second charging adapter to charge from the charging case when (i) the second charging adapter is attached to the second earbud via the first magnetic interface of the second earbud and the second earbud is attached to the charging case via the second magnetic interface of the second earbud.

15. The wearable playback device of claim 12, wherein the first controller is configured to:
stream, via the first IEEE 802.15-compatible interface, an audio stream from a mobile device;
play back the audio stream via the first audio driver; and
cause, via the first IEEE 802.15-compatible interface, the second earbud to play back the audio stream via the second audio driver in synchrony with playback of the audio stream by the first earbud.

16. The wearable playback device of claim 12, wherein the first charging adapter and the second charging adapter are interchangeable between the first earbud and the second earbud.

17. The wearable playback device of claim 12, wherein the first audio driver is carried on a first side of the housing of the first earbud and wherein the second magnetic interface of the first earbud is carried on a second side of the housing of the first earbud, the first side opposite of the second side.

18. A method to be performed by a wearable playback device comprising a first earbud, the method comprising:
detecting attachment of a first charging adapter to the first earbud via a first magnetic interface of the first earbud, wherein the first magnetic interface is carried by a housing of first earbud;
causing an internal battery of the first earbud to charge from the first charging adapter when the first charging adapter is attached to the first magnetic interface of the first earbud;
detecting attachment of the first earbud to a charging case via a second magnetic interface of the first earbud, wherein the second magnetic interface is carried by the housing of the first earbud; and
causing the internal battery of the first earbud to charge from the charging case when the second magnetic interface of first earbud is attached to the charging case.

19. The method of claim 18, wherein the wearable playback device further comprises a second earbud, and wherein the method further comprises:
detecting attachment of a second charging adapter to the second earbud via a first magnetic interface of the second earbud, wherein the first magnetic interface is carried by a housing of the second earbud;
causing an internal battery of the second earbud to charge from the second charging adapter when the first charging adapter is attached to the first magnetic interface of the second earbud;
detecting attachment of the second earbud to the charging case via a second magnetic interface of the second earbud, wherein the second magnetic interface is carried by the housing of second earbud; and
causing the internal battery of the second earbud to charge from the charging case when the second magnetic interface of second earbud is attached to the charging case.

20. The method of claim 19, further comprising:
causing the first charging adapter to charge when (i) the first charging adapter is attached to the first earbud via the first magnetic interface of the first earbud and (ii) the first earbud is attached to the charging case via the second magnetic interface of the first earbud; and
causing the second charging adapter to charge from the charging case when (i) the second charging adapter is attached to the second earbud via the first magnetic interface of the second earbud and the second earbud is attached to the charging case via the second magnetic interface of the second earbud.

* * * * *